United States Patent
Shahane et al.

(10) Patent No.: US 11,714,682 B1
(45) Date of Patent: Aug. 1, 2023

(54) RECLAIMING COMPUTING RESOURCES IN AN ON-DEMAND CODE EXECUTION SYSTEM

(71) Applicant: Amazon Technologies, Inc., Seattle, WA (US)

(72) Inventors: Vishal Shahane, Bothell, WA (US); Marc Brooker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 354 days.

(21) Appl. No.: 16/808,235

(22) Filed: Mar. 3, 2020

(51) Int. Cl.
*G06F 9/50* (2006.01)
*G06F 9/455* (2018.01)

(52) U.S. Cl.
CPC ........ *G06F 9/5016* (2013.01); *G06F 9/45558* (2013.01); *G06F 2009/45583* (2013.01)

(58) Field of Classification Search
None
See application file for complete search history.

(56) References Cited

U.S. PATENT DOCUMENTS

| | | |
|---|---|---|
| 4,949,254 A | 8/1990 | Shorter |
| 5,283,888 A | 2/1994 | Dao et al. |
| 5,835,764 A | 11/1998 | Platt et al. |
| 5,970,488 A | 10/1999 | Crowe et al. |

(Continued)

FOREIGN PATENT DOCUMENTS

| | | |
|---|---|---|
| CA | 2975522 A1 | 8/2016 |
| CN | 1341238 A | 3/2002 |

(Continued)

OTHER PUBLICATIONS

Anonymous: "Docker run reference", Dec. 7, 2015, XP055350246, Retrieved from the Internet: URL:https://web.archive.org/web/20151207111702/https:/docs.docker.com/engine/reference/run/ [retrieved on Feb, 28, 2017].

(Continued)

*Primary Examiner* — Wynuel S Aquino
(74) *Attorney, Agent, or Firm* — Knobbe, Martens, Olson & Bear LLP

(57) ABSTRACT

Systems and methods are described for reclamation of computing resources in an on-demand code execution system. An on-demand code execution system may execute user-submitted code on virtual machine instances, which may be provisioned with quantities of various computing resources (memory, storage, processor time, etc.). These quantities of computing resources may be unused or underutilized depending on the resource requirements of the user-submitted code, or may become idle once the user-submitted code has completed execution. A resource reclamation system may thus reclaim these underutilized computing resources and reallocate them to other uses. The resource reclamation system may interact with a reclaimable resource identification process that executes within the virtual machine instance, which may identify unused or underused computing resources, claim them, and then allow the resource reclamation system to reallocate them. The resource reclamation system may thus enable reclaiming the computing resources without requiring the virtual machine instance to be reprovisioned.

19 Claims, 12 Drawing Sheets

(56) References Cited

U.S. PATENT DOCUMENTS

| | | |
|---|---|---|
| 5,983,197 A | 11/1999 | Enta |
| 6,237,005 B1 | 5/2001 | Griffin |
| 6,260,058 B1 | 7/2001 | Hoenninger et al. |
| 6,385,636 B1 | 5/2002 | Suzuki |
| 6,463,509 B1 | 10/2002 | Teoman et al. |
| 6,501,736 B1 | 12/2002 | Smolik et al. |
| 6,523,035 B1 | 2/2003 | Fleming et al. |
| 6,549,936 B1 | 4/2003 | Hirabayashi |
| 6,708,276 B1 | 3/2004 | Yarsa et al. |
| 7,036,121 B1 | 4/2006 | Casabona et al. |
| 7,308,463 B2 | 12/2007 | Taulbee et al. |
| 7,340,522 B1 | 3/2008 | Basu et al. |
| 7,360,215 B2 | 4/2008 | Kraiss et al. |
| 7,558,719 B1 | 7/2009 | Donlin |
| 7,577,722 B1 | 8/2009 | Khandekar et al. |
| 7,590,806 B2 | 9/2009 | Harris et al. |
| 7,640,574 B1 | 12/2009 | Kim et al. |
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,831,464 B1 | 11/2010 | Nichols et al. |
| 7,870,153 B2 | 1/2011 | Croft et al. |
| 7,886,021 B2 | 2/2011 | Scheifler et al. |
| 7,949,677 B2 | 5/2011 | Croft et al. |
| 7,954,150 B2 | 5/2011 | Croft et al. |
| 8,010,679 B2 | 8/2011 | Low et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVal et al. |
| 8,065,676 B1 | 11/2011 | Sahai et al. |
| 8,065,682 B2 | 11/2011 | Baryshnikov et al. |
| 8,095,931 B1 | 1/2012 | Chen et al. |
| 8,127,284 B2 | 2/2012 | Meijer et al. |
| 8,146,073 B2 | 3/2012 | Sinha |
| 8,166,304 B2 | 4/2012 | Murase et al. |
| 8,171,473 B2 | 5/2012 | Lavin |
| 8,201,026 B1 | 6/2012 | Bornstein et al. |
| 8,209,695 B1 | 6/2012 | Pruyne et al. |
| 8,219,987 B1 | 7/2012 | Vlaovic et al. |
| 8,296,267 B2 | 10/2012 | Cahill et al. |
| 8,321,554 B2 | 11/2012 | Dickinson |
| 8,321,558 B1 | 11/2012 | Sirota et al. |
| 8,336,079 B2 | 12/2012 | Budko et al. |
| 8,352,608 B1 | 1/2013 | Keagy et al. |
| 8,387,075 B1 | 2/2013 | McCann et al. |
| 8,392,558 B1 | 3/2013 | Ahuja et al. |
| 8,402,514 B1 | 3/2013 | Thompson et al. |
| 8,417,723 B1 | 4/2013 | Lissack et al. |
| 8,429,282 B1 | 4/2013 | Ahuja |
| 8,448,165 B1 | 5/2013 | Conover |
| 8,479,195 B2 | 7/2013 | Adams et al. |
| 8,490,088 B2 | 7/2013 | Tang |
| 8,555,281 B1 | 10/2013 | Van Dijk et al. |
| 8,560,699 B1 | 10/2013 | Theimer et al. |
| 8,566,835 B2 | 10/2013 | Wang et al. |
| 8,601,323 B2 | 12/2013 | Tsantilis |
| 8,613,070 B1 | 12/2013 | Borzycki et al. |
| 8,615,589 B1 | 12/2013 | Adogla et al. |
| 8,631,130 B2 | 1/2014 | Jackson |
| 8,667,471 B2 | 3/2014 | Wintergerst et al. |
| 8,677,359 B1 | 3/2014 | Cavage et al. |
| 8,694,996 B2 | 4/2014 | Cawlfield et al. |
| 8,700,768 B2 | 4/2014 | Benari |
| 8,713,093 B1 | 4/2014 | Upadhyay et al. |
| 8,719,415 B1 | 5/2014 | Sirota et al. |
| 8,725,702 B1 | 5/2014 | Raman et al. |
| 8,756,322 B1 | 6/2014 | Lynch |
| 8,756,696 B1 | 6/2014 | Miller |
| 8,763,091 B1 | 6/2014 | Singh et al. |
| 8,769,519 B2 | 7/2014 | Leitman et al. |
| 8,793,676 B2 | 7/2014 | Quinn et al. |
| 8,799,236 B1 | 8/2014 | Azari et al. |
| 8,799,879 B2 | 8/2014 | Wright et al. |
| 8,806,266 B1 | 8/2014 | Qu et al. |
| 8,806,468 B2 | 8/2014 | Meijer et al. |
| 8,806,644 B1 | 8/2014 | McCorkendale et al. |
| 8,819,679 B2 | 8/2014 | Agarwal et al. |
| 8,825,863 B2 | 9/2014 | Hansson et al. |
| 8,825,964 B1 | 9/2014 | Sopka et al. |
| 8,839,035 B1 | 9/2014 | Dimitrovich et al. |
| 8,850,432 B2 | 9/2014 | Mcgrath et al. |
| 8,869,300 B2 | 10/2014 | Singh et al. |
| 8,874,952 B2 | 10/2014 | Tameshige et al. |
| 8,904,008 B2 | 12/2014 | Calder et al. |
| 8,949,457 B1 | 2/2015 | Theroux et al. |
| 8,966,495 B2 | 2/2015 | Kulkarni |
| 8,972,980 B2 | 3/2015 | Banga et al. |
| 8,990,807 B2 | 3/2015 | Wu et al. |
| 8,997,093 B2 | 3/2015 | Dimitrov |
| 9,002,871 B2 | 4/2015 | Bulkowski et al. |
| 9,021,501 B2 | 4/2015 | Li et al. |
| 9,027,087 B2 | 5/2015 | Ishaya et al. |
| 9,038,068 B2 | 5/2015 | Engle et al. |
| 9,052,935 B1 | 6/2015 | Rajaa |
| 9,086,897 B2 | 7/2015 | Oh et al. |
| 9,086,924 B2 | 7/2015 | Barsness et al. |
| 9,092,837 B2 | 7/2015 | Bala et al. |
| 9,098,528 B2 | 8/2015 | Wang |
| 9,104,477 B2 | 8/2015 | Kodialam et al. |
| 9,110,732 B1 | 8/2015 | Forschmiedt et al. |
| 9,110,770 B1 | 8/2015 | Raju et al. |
| 9,111,037 B1 | 8/2015 | Nalis et al. |
| 9,112,813 B2 | 8/2015 | Jackson |
| 9,116,733 B2 | 8/2015 | Banga et al. |
| 9,141,410 B2 | 9/2015 | Leafe et al. |
| 9,146,764 B1 | 9/2015 | Wagner |
| 9,152,406 B2 | 10/2015 | De et al. |
| 9,154,955 B1 | 10/2015 | Bertz et al. |
| 9,164,754 B1 | 10/2015 | Pohlack |
| 9,183,019 B2 | 11/2015 | Kruglick |
| 9,189,778 B1 | 11/2015 | Sh. Al-Rashidi |
| 9,195,520 B2 | 11/2015 | Turk |
| 9,208,007 B2 | 12/2015 | Harper et al. |
| 9,218,190 B2 | 12/2015 | Anand et al. |
| 9,223,561 B2 | 12/2015 | Orveillon et al. |
| 9,223,966 B1 | 12/2015 | Satish et al. |
| 9,250,893 B2 | 2/2016 | Blahaerath et al. |
| 9,268,586 B2 | 2/2016 | Voccio et al. |
| 9,298,633 B1 | 3/2016 | Zhao et al. |
| 9,317,689 B2 | 4/2016 | Aissi |
| 9,323,556 B2 | 4/2016 | Wagner |
| 9,361,145 B1 | 6/2016 | Wilson et al. |
| 9,405,582 B2 | 8/2016 | Fuller et al. |
| 9,411,645 B1 | 8/2016 | Duan et al. |
| 9,413,626 B2 | 8/2016 | Reque et al. |
| 9,417,918 B2 | 8/2016 | Chin et al. |
| 9,430,290 B1 | 8/2016 | Gupta et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,471,776 B2 | 10/2016 | Gu et al. |
| 9,483,335 B1 | 11/2016 | Wagner et al. |
| 9,489,227 B2 | 11/2016 | Oh et al. |
| 9,497,136 B1 | 11/2016 | Ramarao et al. |
| 9,501,345 B1 | 11/2016 | Lietz et al. |
| 9,514,037 B1 | 12/2016 | Dow et al. |
| 9,537,788 B2 | 1/2017 | Reque et al. |
| 9,563,613 B1 | 2/2017 | Dinkel et al. |
| 9,575,798 B2 | 2/2017 | Terayama et al. |
| 9,588,790 B1 | 3/2017 | Wagner et al. |
| 9,594,590 B2 | 3/2017 | Hsu |
| 9,596,350 B1 | 3/2017 | Dymshyts et al. |
| 9,600,312 B2 | 3/2017 | Wagner et al. |
| 9,613,127 B1 | 4/2017 | Rus et al. |
| 9,626,204 B1 | 4/2017 | Banga et al. |
| 9,628,332 B2 | 4/2017 | Bruno, Jr. et al. |
| 9,635,132 B1 | 4/2017 | Lin et al. |
| 9,652,306 B1 | 5/2017 | Wagner et al. |
| 9,652,617 B1 | 5/2017 | Evans et al. |
| 9,654,508 B2 | 5/2017 | Barton et al. |

(56) References Cited

U.S. PATENT DOCUMENTS

| | | |
|---|---|---|
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,703,681 B2 | 7/2017 | Taylor et al. |
| 9,715,402 B2 | 7/2017 | Wagner et al. |
| 9,720,661 B2 | 8/2017 | Gschwind et al. |
| 9,720,662 B2 | 8/2017 | Gschwind et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,760,443 B2 | 9/2017 | Tarasuk-Levin et al. |
| 9,767,271 B2 | 9/2017 | Ghose |
| 9,785,476 B2 | 10/2017 | Wagner et al. |
| 9,787,779 B2 | 10/2017 | Frank et al. |
| 9,798,831 B2 | 10/2017 | Chattopadhyay et al. |
| 9,799,017 B1 | 10/2017 | Vermeulen et al. |
| 9,811,363 B1 | 11/2017 | Wagner |
| 9,811,434 B1 | 11/2017 | Wagner |
| 9,817,695 B2 | 11/2017 | Clark |
| 9,830,175 B1 | 11/2017 | Wagner |
| 9,830,193 B1 | 11/2017 | Wagner et al. |
| 9,830,449 B1 | 11/2017 | Wagner |
| 9,864,636 B1 | 1/2018 | Patel et al. |
| 9,898,393 B2 | 2/2018 | Moorthi et al. |
| 9,910,713 B2 | 3/2018 | Wisniewski et al. |
| 9,921,864 B2 | 3/2018 | Singaravelu et al. |
| 9,928,108 B1 | 3/2018 | Wagner et al. |
| 9,929,916 B1 | 3/2018 | Subramanian et al. |
| 9,930,103 B2 | 3/2018 | Thompson |
| 9,930,133 B2 | 3/2018 | Susarla et al. |
| 9,952,896 B2 | 4/2018 | Wagner et al. |
| 9,977,691 B2 | 5/2018 | Marriner et al. |
| 9,979,817 B2 | 5/2018 | Huang et al. |
| 9,983,982 B1 | 5/2018 | Kumar et al. |
| 10,002,026 B1 | 6/2018 | Wagner |
| 10,002,036 B2 | 6/2018 | Fuchs et al. |
| 10,013,267 B1 | 7/2018 | Wagner et al. |
| 10,042,660 B2 | 8/2018 | Wagner et al. |
| 10,048,974 B1 | 8/2018 | Wagner et al. |
| 10,061,613 B1 | 8/2018 | Brooker et al. |
| 10,067,801 B1 | 9/2018 | Wagner |
| 10,102,040 B2 | 10/2018 | Marriner et al. |
| 10,108,443 B2 | 10/2018 | Wagner et al. |
| 10,139,876 B2 | 11/2018 | Lu et al. |
| 10,140,137 B2 | 11/2018 | Wagner |
| 10,146,635 B1 | 12/2018 | Chai et al. |
| 10,162,655 B2 | 12/2018 | Tuch et al. |
| 10,162,672 B2 | 12/2018 | Wagner et al. |
| 10,162,688 B2 | 12/2018 | Wagner |
| 10,191,861 B1 | 1/2019 | Steinberg |
| 10,193,839 B2 | 1/2019 | Tandon et al. |
| 10,198,298 B2 | 2/2019 | Bishop et al. |
| 10,203,990 B2 | 2/2019 | Wagner et al. |
| 10,248,467 B2 | 4/2019 | Wisniewski et al. |
| 10,255,090 B2 | 4/2019 | Tuch et al. |
| 10,277,708 B2 | 4/2019 | Wagner et al. |
| 10,282,229 B2 | 5/2019 | Wagner et al. |
| 10,303,492 B1 | 5/2019 | Wagner et al. |
| 10,331,462 B1 | 6/2019 | Varda et al. |
| 10,346,625 B2 | 7/2019 | Anderson et al. |
| 10,353,678 B1 | 7/2019 | Wagner |
| 10,353,746 B2 | 7/2019 | Reque et al. |
| 10,360,025 B2 | 7/2019 | Foskett et al. |
| 10,360,067 B1 | 7/2019 | Wagner |
| 10,365,985 B2 | 7/2019 | Wagner |
| 10,387,177 B2 | 8/2019 | Wagner et al. |
| 10,402,231 B2 | 9/2019 | Marriner et al. |
| 10,423,158 B1 | 9/2019 | Hadlich |
| 10,437,629 B2 | 10/2019 | Wagner et al. |
| 10,445,140 B1 | 10/2019 | Sagar et al. |
| 10,459,822 B1 | 10/2019 | Gondi |
| 10,496,547 B1 * | 12/2019 | Naenko ............... G06F 12/0873 |
| 10,503,626 B2 | 12/2019 | Idicula et al. |
| 10,528,390 B2 | 1/2020 | Brooker et al. |
| 10,531,226 B1 | 1/2020 | Wang et al. |
| 10,552,193 B2 | 2/2020 | Wagner et al. |
| 10,552,442 B1 | 2/2020 | Lusk et al. |
| 10,564,946 B1 | 2/2020 | Wagner et al. |
| 10,572,375 B1 | 2/2020 | Wagner |
| 10,592,269 B2 | 3/2020 | Wagner et al. |
| 10,608,973 B2 | 3/2020 | Kuo et al. |
| 10,615,984 B1 | 4/2020 | Wang |
| 10,623,476 B2 | 4/2020 | Thompson |
| 10,637,817 B2 | 4/2020 | Kuo et al. |
| 10,649,749 B1 | 5/2020 | Brooker et al. |
| 10,649,792 B1 | 5/2020 | Kulchytskyy et al. |
| 10,650,156 B2 | 5/2020 | Anderson et al. |
| 10,652,350 B2 | 5/2020 | Wozniak |
| 10,686,605 B2 | 6/2020 | Chhabra et al. |
| 10,691,498 B2 | 6/2020 | Wagner |
| 10,713,080 B1 | 7/2020 | Brooker et al. |
| 10,719,367 B1 | 7/2020 | Kim et al. |
| 10,725,752 B1 | 7/2020 | Wagner et al. |
| 10,725,826 B1 | 7/2020 | Sagar et al. |
| 10,732,951 B2 | 8/2020 | Jayanthi et al. |
| 10,733,085 B1 | 8/2020 | Wagner |
| 10,754,701 B1 | 8/2020 | Wagner |
| 10,776,091 B1 | 9/2020 | Wagner et al. |
| 10,776,171 B2 | 9/2020 | Wagner et al. |
| 10,817,331 B2 | 10/2020 | Mullen et al. |
| 10,824,484 B2 | 11/2020 | Wagner et al. |
| 10,831,898 B1 | 11/2020 | Wagner |
| 10,846,117 B1 | 11/2020 | Steinberg |
| 10,853,112 B2 | 12/2020 | Wagner et al. |
| 10,853,115 B2 | 12/2020 | Mullen et al. |
| 10,884,722 B2 | 1/2021 | Brooker et al. |
| 10,884,787 B1 | 1/2021 | Wagner et al. |
| 10,884,802 B2 | 1/2021 | Wagner et al. |
| 10,884,812 B2 | 1/2021 | Brooker et al. |
| 10,891,145 B2 | 1/2021 | Wagner et al. |
| 10,915,371 B2 | 2/2021 | Wagner et al. |
| 10,942,795 B1 | 3/2021 | Yanacek et al. |
| 10,949,237 B2 | 3/2021 | Piwonka et al. |
| 10,956,185 B2 | 3/2021 | Wagner |
| 11,010,188 B1 | 5/2021 | Brooker et al. |
| 11,016,815 B2 | 5/2021 | Wisniewski et al. |
| 11,099,870 B1 | 8/2021 | Brooker et al. |
| 11,099,917 B2 | 8/2021 | Hussels et al. |
| 11,115,404 B2 | 9/2021 | Siefker et al. |
| 11,119,809 B1 | 9/2021 | Brooker et al. |
| 11,119,813 B1 | 9/2021 | Kasaragod |
| 11,119,826 B2 | 9/2021 | Yanacek et al. |
| 11,126,469 B2 | 9/2021 | Reque et al. |
| 11,132,213 B1 | 9/2021 | Wagner et al. |
| 11,146,569 B1 | 10/2021 | Brooker et al. |
| 11,159,528 B2 | 10/2021 | Siefker et al. |
| 11,188,391 B1 | 11/2021 | Sule |
| 11,190,609 B2 | 11/2021 | Siefker et al. |
| 11,231,955 B1 | 1/2022 | Shahane et al. |
| 11,243,819 B1 | 2/2022 | Wagner |
| 11,243,953 B2 | 2/2022 | Wagner et al. |
| 11,263,034 B2 | 3/2022 | Wagner et al. |
| 11,354,169 B2 | 6/2022 | Marriner et al. |
| 11,360,793 B2 | 6/2022 | Wagner et al. |
| 11,392,497 B1 | 7/2022 | Brooker et al. |
| 11,461,124 B2 | 10/2022 | Wagner et al. |
| 11,467,890 B2 | 10/2022 | Wagner |
| 11,550,713 B1 | 1/2023 | Piwonka et al. |
| 11,561,811 B2 | 1/2023 | Wagner |
| 2001/0044817 A1 | 11/2001 | Asano et al. |
| 2002/0083012 A1 | 6/2002 | Bush et al. |
| 2002/0120685 A1 | 8/2002 | Srivastava et al. |
| 2002/0172273 A1 | 11/2002 | Baker et al. |
| 2003/0071842 A1 | 4/2003 | King et al. |
| 2003/0084434 A1 | 5/2003 | Ren |
| 2003/0149801 A1 | 8/2003 | Kushnirskiy |
| 2003/0177186 A1 | 9/2003 | Goodman et al. |
| 2003/0191795 A1 | 10/2003 | Bernardin et al. |
| 2003/0208569 A1 | 11/2003 | O'Brien et al. |
| 2003/0229794 A1 | 12/2003 | James, II et al. |
| 2004/0003087 A1 | 1/2004 | Chambliss et al. |
| 2004/0019886 A1 | 1/2004 | Berent et al. |
| 2004/0044721 A1 | 3/2004 | Song et al. |
| 2004/0049768 A1 | 3/2004 | Matsuyama et al. |

(56) References Cited

U.S. PATENT DOCUMENTS

| | | |
|---|---|---|
| 2004/0098154 A1 | 5/2004 | McCarthy |
| 2004/0158551 A1 | 8/2004 | Santosuosso |
| 2004/0205493 A1 | 10/2004 | Simpson et al. |
| 2004/0249947 A1 | 12/2004 | Novaes et al. |
| 2004/0268358 A1 | 12/2004 | Darling et al. |
| 2005/0027611 A1 | 2/2005 | Wharton |
| 2005/0044301 A1 | 2/2005 | Vasilevsky et al. |
| 2005/0120160 A1 | 6/2005 | Plouffe et al. |
| 2005/0132167 A1 | 6/2005 | Longobardi |
| 2005/0132368 A1 | 6/2005 | Sexton et al. |
| 2005/0149535 A1 | 7/2005 | Frey et al. |
| 2005/0193113 A1 | 9/2005 | Kokusho et al. |
| 2005/0193283 A1 | 9/2005 | Reinhardt et al. |
| 2005/0237948 A1 | 10/2005 | Wan et al. |
| 2005/0257051 A1 | 11/2005 | Richard |
| 2005/0262183 A1 | 11/2005 | Colrain et al. |
| 2005/0262512 A1 | 11/2005 | Schmidt et al. |
| 2006/0010440 A1 | 1/2006 | Anderson et al. |
| 2006/0015740 A1 | 1/2006 | Kramer |
| 2006/0031448 A1 | 2/2006 | Chu et al. |
| 2006/0036941 A1 | 2/2006 | Neil |
| 2006/0080678 A1 | 4/2006 | Bailey et al. |
| 2006/0123066 A1 | 6/2006 | Jacobs et al. |
| 2006/0129684 A1 | 6/2006 | Datta |
| 2006/0155800 A1 | 7/2006 | Matsumoto |
| 2006/0168174 A1 | 7/2006 | Gebhart et al. |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0218601 A1 | 9/2006 | Michel |
| 2006/0242647 A1 | 10/2006 | Kimbrel et al. |
| 2006/0242709 A1 | 10/2006 | Seinfeld et al. |
| 2006/0248195 A1 | 11/2006 | Toumura et al. |
| 2006/0259763 A1 | 11/2006 | Cooperstein et al. |
| 2006/0288120 A1 | 12/2006 | Hoshino et al. |
| 2007/0033085 A1 | 2/2007 | Johnson |
| 2007/0050779 A1 | 3/2007 | Hayashi |
| 2007/0067321 A1 | 3/2007 | Bissett et al. |
| 2007/0076244 A1 | 4/2007 | Suzuki et al. |
| 2007/0094396 A1 | 4/2007 | Takano et al. |
| 2007/0101325 A1 | 5/2007 | Bystricky et al. |
| 2007/0112864 A1 | 5/2007 | Ben-Natan |
| 2007/0130341 A1 | 6/2007 | Ma |
| 2007/0174419 A1 | 7/2007 | O'Connell et al. |
| 2007/0180449 A1 | 8/2007 | Croft et al. |
| 2007/0180450 A1 | 8/2007 | Croft et al. |
| 2007/0180493 A1 | 8/2007 | Croft et al. |
| 2007/0186212 A1 | 8/2007 | Mazzaferri et al. |
| 2007/0192082 A1 | 8/2007 | Gaos et al. |
| 2007/0192329 A1 | 8/2007 | Croft et al. |
| 2007/0198656 A1 | 8/2007 | Mazzaferri et al. |
| 2007/0199000 A1 | 8/2007 | Shekhel et al. |
| 2007/0220009 A1 | 9/2007 | Morris et al. |
| 2007/0226700 A1 | 9/2007 | Gal et al. |
| 2007/0240160 A1 | 10/2007 | Paterson-Jones |
| 2007/0255604 A1 | 11/2007 | Seelig |
| 2007/0300297 A1 | 12/2007 | Dawson et al. |
| 2008/0028409 A1 | 1/2008 | Cherkasova et al. |
| 2008/0052401 A1 | 2/2008 | Bugenhagen et al. |
| 2008/0052725 A1 | 2/2008 | Stoodley et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0115143 A1 | 5/2008 | Shimizu et al. |
| 2008/0126110 A1 | 5/2008 | Haeberle et al. |
| 2008/0126486 A1 | 5/2008 | Heist |
| 2008/0127125 A1 | 5/2008 | Anckaert et al. |
| 2008/0147893 A1 | 6/2008 | Marripudi et al. |
| 2008/0178278 A1 | 7/2008 | Grinstein et al. |
| 2008/0184340 A1 | 7/2008 | Nakamura et al. |
| 2008/0189468 A1 | 8/2008 | Schmidt et al. |
| 2008/0195369 A1 | 8/2008 | Duyanovich et al. |
| 2008/0201568 A1 | 8/2008 | Quinn et al. |
| 2008/0201711 A1 | 8/2008 | Amir Husain |
| 2008/0209423 A1 | 8/2008 | Hirai |
| 2008/0244547 A1 | 10/2008 | Wintergerst et al. |
| 2008/0288940 A1 | 11/2008 | Adams et al. |
| 2008/0307098 A1 | 12/2008 | Kelly |
| 2009/0006897 A1 | 1/2009 | Sarsfield |
| 2009/0013153 A1 | 1/2009 | Hilton |
| 2009/0018892 A1 | 1/2009 | Grey et al. |
| 2009/0025009 A1 | 1/2009 | Brunswig et al. |
| 2009/0005581 A1 | 2/2009 | Kondur |
| 2009/0034537 A1 | 2/2009 | Colrain et al. |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0158407 A1 | 6/2009 | Nicodemus et al. |
| 2009/0177860 A1 | 7/2009 | Zhu et al. |
| 2009/0183162 A1 | 7/2009 | Kindel et al. |
| 2009/0193410 A1 | 7/2009 | Arthursson et al. |
| 2009/0198769 A1 | 8/2009 | Keller et al. |
| 2009/0204960 A1 | 8/2009 | Ben-yehuda et al. |
| 2009/0204964 A1 | 8/2009 | Foley et al. |
| 2009/0222922 A1 | 9/2009 | Sidiroglou et al. |
| 2009/0271472 A1 | 10/2009 | Scheifler et al. |
| 2009/0288084 A1 | 11/2009 | Astete et al. |
| 2009/0300151 A1 | 12/2009 | Friedman et al. |
| 2009/0300599 A1 | 12/2009 | Piotrowski |
| 2009/0307430 A1 | 12/2009 | Bruening et al. |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0037031 A1 | 2/2010 | DeSantis et al. |
| 2010/0058342 A1 | 3/2010 | Machida |
| 2010/0058351 A1 | 3/2010 | Yahagi |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0083048 A1 | 4/2010 | Calinoiu et al. |
| 2010/0083248 A1 | 4/2010 | Wood et al. |
| 2010/0094816 A1 | 4/2010 | Groves, Jr. et al. |
| 2010/0106926 A1 | 4/2010 | Kandasamy et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1 | 5/2010 | Cheriton |
| 2010/0131959 A1 | 5/2010 | Spiers et al. |
| 2010/0146004 A1 | 6/2010 | Sim-Tang |
| 2010/0169477 A1 | 7/2010 | Stienhans et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0257269 A1 | 10/2010 | Clark |
| 2010/0269109 A1 | 10/2010 | Cartales |
| 2010/0298011 A1 | 11/2010 | Pelley et al. |
| 2010/0299541 A1 | 11/2010 | Ishikawa et al. |
| 2010/0312871 A1 | 12/2010 | Desantis et al. |
| 2010/0325727 A1 | 12/2010 | Neystadt et al. |
| 2010/0329149 A1 | 12/2010 | Singh et al. |
| 2010/0329643 A1 | 12/2010 | Kuang |
| 2011/0004687 A1 | 1/2011 | Takemura |
| 2011/0010690 A1 | 1/2011 | Howard et al. |
| 2011/0010722 A1 | 1/2011 | Matsuyama |
| 2011/0023026 A1 | 1/2011 | Oza |
| 2011/0029970 A1 | 2/2011 | Arasaratnam |
| 2011/0029984 A1 | 2/2011 | Norman et al. |
| 2011/0035785 A1 | 2/2011 | Mihara |
| 2011/0040812 A1 | 2/2011 | Phillips |
| 2011/0055378 A1 | 3/2011 | Ferris et al. |
| 2011/0055396 A1 | 3/2011 | DeHaan |
| 2011/0055683 A1 | 3/2011 | Jiang |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153541 A1 | 6/2011 | Koch et al. |
| 2011/0153727 A1 | 6/2011 | Li |

(56) References Cited

U.S. PATENT DOCUMENTS

| | | |
|---|---|---|
| 2011/0153838 A1 | 6/2011 | Belkine et al. |
| 2011/0154353 A1 | 6/2011 | Theroux et al. |
| 2011/0173637 A1 | 7/2011 | Brandwine et al. |
| 2011/0179162 A1 | 7/2011 | Mayo et al. |
| 2011/0184993 A1 | 7/2011 | Chawla et al. |
| 2011/0208866 A1 | 8/2011 | Marmolejo-Meillon et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0258603 A1 | 10/2011 | Wisnovsky et al. |
| 2011/0265067 A1 | 10/2011 | Schulte et al. |
| 2011/0265069 A1 | 10/2011 | Fee et al. |
| 2011/0265164 A1 | 10/2011 | Lucovsky |
| 2011/0271276 A1 | 11/2011 | Ashok et al. |
| 2011/0276945 A1 | 11/2011 | Chasman et al. |
| 2011/0276963 A1 | 11/2011 | Wu et al. |
| 2011/0296412 A1 | 12/2011 | Banga et al. |
| 2011/0314465 A1 | 12/2011 | Smith et al. |
| 2011/0321033 A1 | 12/2011 | Kelkar et al. |
| 2011/0321051 A1 | 12/2011 | Rastogi |
| 2012/0011496 A1 | 1/2012 | Shimamura |
| 2012/0011511 A1 | 1/2012 | Horvitz et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0060207 A1 | 3/2012 | Mardikar et al. |
| 2012/0072762 A1 | 3/2012 | Atchison et al. |
| 2012/0072914 A1 | 3/2012 | Ota |
| 2012/0072920 A1 | 3/2012 | Kawamura |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0102481 A1 | 4/2012 | Mani et al. |
| 2012/0102493 A1 | 4/2012 | Allen et al. |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0110603 A1 | 5/2012 | Kaneko et al. |
| 2012/0124563 A1 | 5/2012 | Chung et al. |
| 2012/0131379 A1 | 5/2012 | Tameshige et al. |
| 2012/0144290 A1 | 6/2012 | Goldman et al. |
| 2012/0166624 A1 | 6/2012 | Suit et al. |
| 2012/0173709 A1 | 7/2012 | Li et al. |
| 2012/0192184 A1 | 7/2012 | Burckart et al. |
| 2012/0197795 A1 | 8/2012 | Campbell et al. |
| 2012/0197958 A1 | 8/2012 | Nightingale et al. |
| 2012/0198442 A1 | 8/2012 | Kashyap et al. |
| 2012/0198514 A1 | 8/2012 | McCune et al. |
| 2012/0204164 A1 | 8/2012 | Castanos et al. |
| 2012/0209947 A1 | 8/2012 | Glaser et al. |
| 2012/0222038 A1 | 8/2012 | Katragadda et al. |
| 2012/0233464 A1 | 9/2012 | Miller et al. |
| 2012/0254193 A1 | 10/2012 | Chattopadhyay et al. |
| 2012/0324236 A1 | 12/2012 | Srivastava et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0061212 A1 | 3/2013 | Krause et al. |
| 2013/0061220 A1 | 3/2013 | Gnanasambandam et al. |
| 2013/0067484 A1 | 3/2013 | Sonoda et al. |
| 2013/0067494 A1 | 3/2013 | Srour et al. |
| 2013/0080641 A1 | 3/2013 | Lui et al. |
| 2013/0091387 A1 | 4/2013 | Bohnet et al. |
| 2013/0097601 A1 | 4/2013 | Podvratnik et al. |
| 2013/0111032 A1 | 5/2013 | Alapati et al. |
| 2013/0111469 A1 | 5/2013 | B et al. |
| 2013/0124807 A1 | 5/2013 | Nielsen et al. |
| 2013/0132942 A1 | 5/2013 | Wang |
| 2013/0132953 A1 | 5/2013 | Chuang et al. |
| 2013/0139152 A1 | 5/2013 | Chang et al. |
| 2013/0139166 A1 | 5/2013 | Zhang et al. |
| 2013/0145354 A1 | 6/2013 | Bruening et al. |
| 2013/0151587 A1 | 6/2013 | Takeshima et al. |
| 2013/0151648 A1 | 6/2013 | Luna |
| 2013/0151684 A1 | 6/2013 | Forsman et al. |
| 2013/0152047 A1 | 6/2013 | Moorthi et al. |
| 2013/0167147 A1 | 6/2013 | Corrie et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0185719 A1 | 7/2013 | Kar et al. |
| 2013/0185729 A1 | 7/2013 | Vasic et al. |
| 2013/0191924 A1 | 7/2013 | Tedesco |
| 2013/0022771 A1 | 8/2013 | Barak et al. |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0205114 A1 | 8/2013 | Badam et al. |
| 2013/0219390 A1 | 8/2013 | Lee et al. |
| 2013/0227097 A1 | 8/2013 | Yasuda et al. |
| 2013/0227480 A1 | 8/2013 | Ike et al. |
| 2013/0227534 A1 | 8/2013 | Ike et al. |
| 2013/0227563 A1 | 8/2013 | McGrath |
| 2013/0227641 A1 | 8/2013 | White et al. |
| 2013/0232190 A1 | 9/2013 | Miller et al. |
| 2013/0232480 A1 | 9/2013 | Winterfeldt et al. |
| 2013/0239125 A1 | 9/2013 | Iorio |
| 2013/0246944 A1 | 9/2013 | Pandiyan et al. |
| 2013/0262556 A1 | 10/2013 | Xu et al. |
| 2013/0263117 A1 | 10/2013 | Konik et al. |
| 2013/0274006 A1 | 10/2013 | Hudlow et al. |
| 2013/0275376 A1 | 10/2013 | Hudlow et al. |
| 2013/0275958 A1 | 10/2013 | Ivanov et al. |
| 2013/0275969 A1 | 10/2013 | Dimitrov |
| 2013/0275975 A1 | 10/2013 | Masuda et al. |
| 2013/0283141 A1 | 10/2013 | Stevenson et al. |
| 2013/0283176 A1 | 10/2013 | Hoole et al. |
| 2013/0290538 A1 | 10/2013 | Gmach et al. |
| 2013/0291087 A1 | 10/2013 | Kailash et al. |
| 2013/0297964 A1 | 11/2013 | Hegdal et al. |
| 2013/0298183 A1 | 11/2013 | McGrath et al. |
| 2013/0311650 A1 | 11/2013 | Brandwine et al. |
| 2013/0326506 A1 | 12/2013 | McGrath et al. |
| 2013/0326507 A1 | 12/2013 | McGrath et al. |
| 2013/0332660 A1 | 12/2013 | Talagala et al. |
| 2013/0339950 A1 | 12/2013 | Ramarathinam et al. |
| 2013/0346470 A1 | 12/2013 | Obstfeld et al. |
| 2013/0346946 A1 | 12/2013 | Pinnix |
| 2013/0346952 A1 | 12/2013 | Huang et al. |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0047437 A1 | 2/2014 | Wu et al. |
| 2014/0058871 A1 | 2/2014 | Marr et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068568 A1 | 3/2014 | Wisnovsky |
| 2014/0068608 A1 | 3/2014 | Kulkarni |
| 2014/0068611 A1 | 3/2014 | McGrath et al. |
| 2014/0073300 A1 | 3/2014 | Leeder et al. |
| 2014/0081984 A1 | 3/2014 | Sitsky et al. |
| 2014/0082165 A1 | 3/2014 | Marr et al. |
| 2014/0082201 A1 | 3/2014 | Shankari et al. |
| 2014/0101643 A1 | 4/2014 | Inoue |
| 2014/0101649 A1 | 4/2014 | Kamble et al. |

(56) References Cited

U.S. PATENT DOCUMENTS

| | | |
|---|---|---|
| 2014/0108722 A1 | 4/2014 | Lipchuk et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0137110 A1 | 5/2014 | Engle et al. |
| 2014/0164551 A1 | 6/2014 | Resch et al. |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0189704 A1 | 7/2014 | Narvaez et al. |
| 2014/0201735 A1 | 7/2014 | Kannan et al. |
| 2014/0207912 A1 | 7/2014 | Thibeault |
| 2014/0214752 A1 | 7/2014 | Rash et al. |
| 2014/0215073 A1 | 7/2014 | Dow et al. |
| 2014/0229221 A1 | 8/2014 | Shih et al. |
| 2014/0229942 A1 | 8/2014 | Wiseman et al. |
| 2014/0245297 A1 | 8/2014 | Hackett |
| 2014/0258777 A1 | 9/2014 | Cheriton |
| 2014/0279581 A1 | 9/2014 | Devereaux |
| 2014/0280325 A1 | 9/2014 | Krishnamurthy et al. |
| 2014/0282418 A1 | 9/2014 | Wood et al. |
| 2014/0282559 A1 | 9/2014 | Verduzco et al. |
| 2014/0282615 A1 | 9/2014 | Cavage et al. |
| 2014/0282629 A1 | 9/2014 | Gupta et al. |
| 2014/0283045 A1 | 9/2014 | Brandwine et al. |
| 2014/0289286 A1 | 9/2014 | Gusak |
| 2014/0298295 A1 | 10/2014 | Overbeck |
| 2014/0304246 A1 | 10/2014 | Helmich et al. |
| 2014/0304698 A1 | 10/2014 | Chigurapati et al. |
| 2014/0304815 A1 | 10/2014 | Maeda |
| 2014/0317617 A1 | 10/2014 | O'Donnell |
| 2014/0330936 A1 | 11/2014 | Factor et al. |
| 2014/0331222 A1 | 11/2014 | Zheng |
| 2014/0337953 A1 | 11/2014 | Banatwala et al. |
| 2014/0344457 A1 | 11/2014 | Bruno, Jr. et al. |
| 2014/0344736 A1 | 11/2014 | Ryman et al. |
| 2014/0351674 A1 | 11/2014 | Grube et al. |
| 2014/0359093 A1 | 12/2014 | Raju et al. |
| 2014/0359608 A1 | 12/2014 | Tsirkin et al. |
| 2014/0365781 A1 | 12/2014 | Dmitrienko et al. |
| 2014/0372489 A1 | 12/2014 | Jaiswal et al. |
| 2014/0372533 A1 | 12/2014 | Fu et al. |
| 2014/0380085 A1 | 12/2014 | Rash et al. |
| 2015/0006487 A1 | 1/2015 | Yang et al. |
| 2015/0033241 A1 | 1/2015 | Jackson et al. |
| 2015/0039891 A1 | 2/2015 | Ignatchenko et al. |
| 2015/0040229 A1 | 2/2015 | Chan et al. |
| 2015/0046926 A1 | 2/2015 | Kenchammana-Hosekote et al. |
| 2015/0046971 A1 | 2/2015 | Huh et al. |
| 2015/0052258 A1 | 2/2015 | Johnson et al. |
| 2015/0058914 A1 | 2/2015 | Yadav |
| 2015/0067019 A1 | 3/2015 | Balko |
| 2015/0067830 A1 | 3/2015 | Johansson et al. |
| 2015/0074659 A1 | 3/2015 | Madsen et al. |
| 2015/0074661 A1 | 3/2015 | Kothari et al. |
| 2015/0074662 A1 | 3/2015 | Saladi et al. |
| 2015/0074675 A1 | 3/2015 | Qi et al. |
| 2015/0081885 A1 | 3/2015 | Thomas et al. |
| 2015/0095822 A1 | 4/2015 | Feis et al. |
| 2015/0106805 A1 | 4/2015 | Melander et al. |
| 2015/0120928 A1 | 4/2015 | Gummaraju et al. |
| 2015/0121391 A1 | 4/2015 | Wang |
| 2015/0134626 A1 | 5/2015 | Theimer et al. |
| 2015/0135287 A1 | 5/2015 | Medeiros et al. |
| 2015/0142747 A1 | 5/2015 | Zou |
| 2015/0142952 A1 | 5/2015 | Bragstad et al. |
| 2015/0143374 A1 | 5/2015 | Banga et al. |
| 2015/0143381 A1 | 5/2015 | Chin et al. |
| 2015/0146716 A1 | 5/2015 | Olivier et al. |
| 2015/0154046 A1 | 6/2015 | Farkas et al. |
| 2015/0161384 A1 | 6/2015 | Gu et al. |
| 2015/0163231 A1 | 6/2015 | Sobko et al. |
| 2015/0178019 A1 | 6/2015 | Hegdal et al. |
| 2015/0178110 A1 | 6/2015 | Li et al. |
| 2015/0186129 A1 | 7/2015 | Apte et al. |
| 2015/0188775 A1 | 7/2015 | Van Der Walt et al. |
| 2015/0199218 A1 | 7/2015 | Wilson et al. |
| 2015/0205596 A1 | 7/2015 | Hiltegen et al. |
| 2015/0212818 A1 | 7/2015 | Gschwind et al. |
| 2015/0227598 A1 | 8/2015 | Hahn et al. |
| 2015/0229645 A1 | 8/2015 | Keith et al. |
| 2015/0235144 A1 | 8/2015 | Gusev et al. |
| 2015/0242225 A1 | 8/2015 | Muller et al. |
| 2015/0254248 A1 | 9/2015 | Burns et al. |
| 2015/0256514 A1 | 9/2015 | Laivand et al. |
| 2015/0256621 A1 | 9/2015 | Noda et al. |
| 2015/0261578 A1 | 9/2015 | Greden et al. |
| 2015/0264014 A1 | 9/2015 | Budhani et al. |
| 2015/0269494 A1 | 9/2015 | Kardes et al. |
| 2015/0271073 A1* | 9/2015 | Saladi ............... H04L 47/283 370/230 |
| 2015/0271280 A1 | 9/2015 | Zhang et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0319174 A1 | 11/2015 | Hayton et al. |
| 2015/0324174 A1 | 11/2015 | Bromley et al. |
| 2015/0324182 A1 | 11/2015 | Barros et al. |
| 2015/0324210 A1 | 11/2015 | Carlson |
| 2015/0324229 A1 | 11/2015 | Valine |
| 2015/0332048 A1 | 11/2015 | Mooring et al. |
| 2015/0332195 A1 | 11/2015 | Jue |
| 2015/0334173 A1 | 11/2015 | Coulmeau et al. |
| 2015/0350701 A1 | 12/2015 | Lemus et al. |
| 2015/0356294 A1 | 12/2015 | Tan et al. |
| 2015/0363181 A1 | 12/2015 | Alberti et al. |
| 2015/0363304 A1 | 12/2015 | Nagamalla et al. |
| 2015/0370560 A1 | 12/2015 | Tan et al. |
| 2015/0370591 A1 | 12/2015 | Tuch et al. |
| 2015/0370592 A1 | 12/2015 | Tuch et al. |
| 2015/0371244 A1 | 12/2015 | Neuse et al. |
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0011901 A1 | 1/2016 | Hurwitz et al. |
| 2016/0012099 A1 | 1/2016 | Tuatini et al. |
| 2016/0019081 A1 | 1/2016 | Chandrasekaran et al. |
| 2016/0019082 A1 | 1/2016 | Chandrasekaran et al. |
| 2016/0019536 A1 | 1/2016 | Ortiz et al. |
| 2016/0021112 A1 | 1/2016 | Katieb |
| 2016/0026486 A1 | 1/2016 | Abdallah |
| 2016/0048606 A1 | 2/2016 | Rubinstein et al. |
| 2016/0070714 A1 | 3/2016 | D'Sa et al. |
| 2016/0072727 A1 | 3/2016 | Leafe et al. |
| 2016/0077901 A1 | 3/2016 | Roth et al. |
| 2016/0092320 A1 | 3/2016 | Baca |
| 2016/0092493 A1 | 3/2016 | Ko et al. |
| 2016/0098285 A1 | 4/2016 | Davis et al. |
| 2016/0100036 A1 | 4/2016 | Lo et al. |
| 2016/0103739 A1 | 4/2016 | Huang et al. |
| 2016/0110188 A1 | 4/2016 | Verde et al. |
| 2016/0117163 A1 | 4/2016 | Fukui et al. |
| 2016/0117254 A1 | 4/2016 | Susarla et al. |
| 2016/0119289 A1 | 4/2016 | Jain et al. |
| 2016/0124665 A1 | 5/2016 | Jain et al. |
| 2016/0124978 A1 | 5/2016 | Nithrakashyap et al. |
| 2016/0140180 A1 | 5/2016 | Park et al. |
| 2016/0150053 A1 | 5/2016 | Janczuk et al. |
| 2016/0188367 A1 | 6/2016 | Zeng |
| 2016/0191420 A1 | 6/2016 | Nagarajan et al. |
| 2016/0198235 A1 | 7/2016 | Liu et al. |
| 2016/0203219 A1 | 7/2016 | Hoch et al. |
| 2016/0212007 A1 | 7/2016 | Alatorre et al. |
| 2016/0226955 A1 | 8/2016 | Moorthi et al. |
| 2016/0282930 A1 | 9/2016 | Ramachandran et al. |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0306613 A1 | 10/2016 | Busi et al. |
| 2016/0315910 A1 | 10/2016 | Kaufman |
| 2016/0350099 A1 | 12/2016 | Suparna et al. |

(56) References Cited

U.S. PATENT DOCUMENTS

| | | |
|---|---|---|
| 2016/0350124 A1 | 12/2016 | Gschwind et al. |
| 2016/0357536 A1 | 12/2016 | Firlik et al. |
| 2016/0364265 A1 | 12/2016 | Cao et al. |
| 2016/0364316 A1 | 12/2016 | Bhat et al. |
| 2016/0371127 A1 | 12/2016 | Antony et al. |
| 2016/0371156 A1 | 12/2016 | Merriman |
| 2016/0378449 A1 | 12/2016 | Khazanchi et al. |
| 2016/0378525 A1 | 12/2016 | Bjorkengren |
| 2016/0378547 A1 | 12/2016 | Brouwer et al. |
| 2016/0378554 A1 | 12/2016 | Gummaraju et al. |
| 2017/0004169 A1 | 1/2017 | Merrill et al. |
| 2017/0032000 A1 | 2/2017 | Sharma et al. |
| 2017/0041144 A1 | 2/2017 | Krapf et al. |
| 2017/0041309 A1 | 2/2017 | Ekambaram et al. |
| 2017/0060615 A1 | 3/2017 | Thakkar et al. |
| 2017/0060621 A1 | 3/2017 | Whipple et al. |
| 2017/0068574 A1 | 3/2017 | Cherkasova et al. |
| 2017/0075749 A1 | 3/2017 | Ambichl et al. |
| 2017/0083381 A1 | 3/2017 | Cong et al. |
| 2017/0085447 A1 | 3/2017 | Chen et al. |
| 2017/0085502 A1 | 3/2017 | Biruduraju |
| 2017/0085591 A1 | 3/2017 | Ganda et al. |
| 2017/0091235 A1 | 3/2017 | Yammine et al. |
| 2017/0091296 A1 | 3/2017 | Beard et al. |
| 2017/0093684 A1 | 3/2017 | Jayaraman et al. |
| 2017/0093920 A1 | 3/2017 | Ducatel et al. |
| 2017/0134519 A1 | 5/2017 | Chen et al. |
| 2017/0142099 A1 | 5/2017 | Hinohara et al. |
| 2017/0147656 A1 | 5/2017 | Choudhary et al. |
| 2017/0149740 A1 | 5/2017 | Mansour et al. |
| 2017/0153965 A1 | 6/2017 | Nitta et al. |
| 2017/0161059 A1 | 6/2017 | Wood et al. |
| 2017/0177266 A1 | 6/2017 | Doerner et al. |
| 2017/0177441 A1 | 6/2017 | Chow |
| 2017/0177854 A1 | 6/2017 | Gligor et al. |
| 2017/0188213 A1 | 6/2017 | Nirantar et al. |
| 2017/0192825 A1 | 7/2017 | Biberman et al. |
| 2017/0221000 A1 | 8/2017 | Anand |
| 2017/0230262 A1 | 8/2017 | Sreeramoju et al. |
| 2017/0230499 A1 | 8/2017 | Mumick et al. |
| 2017/0249130 A1 | 8/2017 | Smiljamic et al. |
| 2017/0264681 A1 | 9/2017 | Apte et al. |
| 2017/0272462 A1 | 9/2017 | Kraemer et al. |
| 2017/0286187 A1 | 10/2017 | Chen et al. |
| 2017/0288878 A1 | 10/2017 | Lee et al. |
| 2017/0308520 A1 | 10/2017 | Beahan, Jr. et al. |
| 2017/0315163 A1 | 11/2017 | Wang et al. |
| 2017/0329578 A1 | 11/2017 | Iscen |
| 2017/0346808 A1 | 11/2017 | Anzai et al. |
| 2017/0353851 A1 | 12/2017 | Gonzalez et al. |
| 2017/0364345 A1 | 12/2017 | Fontoura et al. |
| 2017/0371720 A1 | 12/2017 | Basu et al. |
| 2017/0372142 A1 | 12/2017 | Bilobrov |
| 2018/0004555 A1 | 1/2018 | Ramanathan et al. |
| 2018/0004556 A1 | 1/2018 | Marriner et al. |
| 2018/0004572 A1 | 1/2018 | Wagner et al. |
| 2018/0004575 A1 | 1/2018 | Marriner et al. |
| 2018/0032410 A1 | 2/2018 | Kang et al. |
| 2018/0046453 A1 | 2/2018 | Nair et al. |
| 2018/0046482 A1 | 2/2018 | Karve et al. |
| 2018/0060132 A1 | 3/2018 | Maru et al. |
| 2018/0060221 A1 | 3/2018 | Yim et al. |
| 2018/0060318 A1 | 3/2018 | Yang et al. |
| 2018/0067841 A1 | 3/2018 | Mahimkar |
| 2018/0067873 A1 | 3/2018 | Pikhur et al. |
| 2018/0069702 A1 | 3/2018 | Ayyadevara et al. |
| 2018/0081717 A1 | 3/2018 | Li |
| 2018/0089232 A1 | 3/2018 | Spektor et al. |
| 2018/0095738 A1 | 4/2018 | Dürkop et al. |
| 2018/0113770 A1 | 4/2018 | Hasanov et al. |
| 2018/0121665 A1 | 5/2018 | Anderson et al. |
| 2018/0129684 A1 | 5/2018 | Wilson et al. |
| 2018/0144263 A1 | 5/2018 | Saxena et al. |
| 2018/0150339 A1 | 5/2018 | Pan et al. |
| 2018/0152401 A1 | 5/2018 | Tandon et al. |
| 2018/0152405 A1* | 5/2018 | Kuo ........................ H04L 51/18 |
| 2018/0152406 A1 | 5/2018 | Kuo et al. |
| 2018/0192101 A1 | 7/2018 | Bilobrov |
| 2018/0225096 A1 | 8/2018 | Mishra et al. |
| 2018/0227300 A1 | 8/2018 | Nakic et al. |
| 2018/0239636 A1 | 8/2018 | Arora et al. |
| 2018/0253333 A1 | 9/2018 | Gupta |
| 2018/0268130 A1 | 9/2018 | Ghosh et al. |
| 2018/0275987 A1 | 9/2018 | Vandeputte |
| 2018/0285101 A1 | 10/2018 | Yahav et al. |
| 2018/0300111 A1 | 10/2018 | Bhat et al. |
| 2018/0314845 A1 | 11/2018 | Anderson et al. |
| 2018/0316552 A1 | 11/2018 | Subramani Nadar et al. |
| 2018/0341504 A1 | 11/2018 | Kissell |
| 2018/0365422 A1 | 12/2018 | Callaghan et al. |
| 2018/0375781 A1 | 12/2018 | Chen et al. |
| 2019/0004866 A1 | 1/2019 | Du et al. |
| 2019/0018715 A1 | 1/2019 | Behrendt et al. |
| 2019/0028552 A1 | 1/2019 | Johnson, II et al. |
| 2019/0034095 A1* | 1/2019 | Singh .................... G06F 3/0685 |
| 2019/0043231 A1 | 2/2019 | Uzgin et al. |
| 2019/0072529 A1 | 3/2019 | Andrawes et al. |
| 2019/0073430 A1 | 3/2019 | Webster |
| 2019/0079751 A1 | 3/2019 | Foskett et al. |
| 2019/0102278 A1 | 4/2019 | Gahlin et al. |
| 2019/0140831 A1 | 5/2019 | De Lima Junior et al. |
| 2019/0141015 A1 | 5/2019 | Nellen |
| 2019/0147085 A1 | 5/2019 | Pal et al. |
| 2019/0171423 A1 | 6/2019 | Mishra et al. |
| 2019/0179678 A1 | 6/2019 | Banerjee et al. |
| 2019/0179725 A1 | 6/2019 | Mital et al. |
| 2019/0180036 A1 | 6/2019 | Shukla |
| 2019/0188288 A1 | 6/2019 | Holm et al. |
| 2019/0196884 A1 | 6/2019 | Wagner |
| 2019/0235848 A1 | 8/2019 | Swiecki et al. |
| 2019/0238590 A1 | 8/2019 | Talukdar et al. |
| 2019/0250937 A1 | 8/2019 | Thomas et al. |
| 2019/0268152 A1 | 8/2019 | Sandoval et al. |
| 2019/0278938 A1 | 9/2019 | Greene et al. |
| 2019/0286475 A1 | 9/2019 | Mani |
| 2019/0286492 A1 | 9/2019 | Gulsvig Wood et al. |
| 2019/0303117 A1 | 10/2019 | Kocberber et al. |
| 2019/0311115 A1 | 10/2019 | Lavi et al. |
| 2019/0318312 A1 | 10/2019 | Foskett et al. |
| 2019/0324813 A1 | 10/2019 | Bogineni et al. |
| 2019/0339955 A1 | 11/2019 | Kuo et al. |
| 2019/0361802 A1 | 11/2019 | Li et al. |
| 2019/0363885 A1 | 11/2019 | Schiavoni et al. |
| 2019/0370113 A1 | 12/2019 | Zhang et al. |
| 2020/0007456 A1 | 1/2020 | Greenstein et al. |
| 2020/0026527 A1 | 1/2020 | Xu et al. |
| 2020/0028936 A1 | 1/2020 | Gupta et al. |
| 2020/0034471 A1 | 1/2020 | Danilov et al. |
| 2020/0065079 A1 | 2/2020 | Kocberber et al. |
| 2020/0073770 A1 | 3/2020 | Mortimore, Jr. et al. |
| 2020/0073987 A1 | 3/2020 | Perumala et al. |
| 2020/0081745 A1 | 3/2020 | Cybulski et al. |
| 2020/0110691 A1 | 4/2020 | Bryant et al. |
| 2020/0120120 A1 | 4/2020 | Cybulski |
| 2020/0136933 A1 | 4/2020 | Raskar |
| 2020/0153798 A1 | 5/2020 | Liebherr |
| 2020/0153897 A1 | 5/2020 | Mestery et al. |
| 2020/0167208 A1 | 5/2020 | Floes et al. |
| 2020/0192646 A1 | 6/2020 | Yerramreddy et al. |
| 2020/0213151 A1 | 7/2020 | Srivatsan et al. |
| 2020/0327236 A1 | 10/2020 | Pratt et al. |
| 2020/0341799 A1 | 10/2020 | Wagner et al. |
| 2020/0349067 A1* | 11/2020 | Syamala ............ G06F 12/0253 |
| 2020/0366587 A1 | 11/2020 | White et al. |
| 2020/0401455 A1 | 12/2020 | Church et al. |
| 2021/0019056 A1* | 1/2021 | Mangione-Tran ...... G06F 12/00 |
| 2021/0081233 A1 | 3/2021 | Mullen et al. |
| 2021/0117534 A1 | 4/2021 | Maximov et al. |
| 2021/0389963 A1 | 12/2021 | Wagner |
| 2022/0004423 A1 | 1/2022 | Brooker et al. |
| 2022/0012083 A1 | 1/2022 | Brooker et al. |
| 2022/0391238 A1 | 12/2022 | Wagner |

(56) References Cited

U.S. PATENT DOCUMENTS

FOREIGN PATENT DOCUMENTS

| | | |
|---|---|---|
| CN | 101002170 A | 7/2007 |
| CN | 101267334 A | 9/2008 |
| CN | 101345757 A | 1/2009 |
| CN | 101496005 A | 7/2009 |
| CN | 101627388 A | 1/2010 |
| CN | 101640700 A | 2/2010 |
| CN | 101764824 A | 6/2010 |
| CN | 102171712 A | 8/2011 |
| CN | 102365858 A | 2/2012 |
| CN | 102420846 A | 4/2012 |
| CN | 102761549 A | 10/2012 |
| CN | 103098027 A | 5/2013 |
| CN | 103140828 A | 6/2013 |
| CN | 103384237 A | 11/2013 |
| CN | 103731427 A | 4/2014 |
| CN | 104111848 A | 10/2014 |
| CN | 104243479 A | 12/2014 |
| CN | 104903854 A | 9/2015 |
| CN | 105122243 A | 12/2015 |
| CN | 109478134 A | 3/2019 |
| CN | 112513813 A | 3/2021 |
| EP | 2663052 A1 | 11/2013 |
| EP | 3201762 A1 | 8/2017 |
| EP | 3254434 A1 | 12/2017 |
| EP | 3356938 A1 | 8/2018 |
| EP | 3201768 B1 | 12/2019 |
| EP | 3811209 A1 | 4/2021 |
| EP | 3814895 A1 | 5/2021 |
| EP | 3857375 A1 | 8/2021 |
| EP | 4064052 A1 | 9/2022 |
| JP | 2002-287974 A | 10/2002 |
| JP | 2006-107599 A | 4/2006 |
| JP | 2007-080161 A | 3/2007 |
| JP | 2007-538323 A | 12/2007 |
| JP | 2010-026562 A | 2/2010 |
| JP | 2011-065243 A | 3/2011 |
| JP | 2011-233146 A | 11/2011 |
| JP | 2011-257847 A | 12/2011 |
| JP | 2012-078893 A | 4/2012 |
| JP | 2012-104150 A | 5/2012 |
| JP | 2013-156996 A | 8/2013 |
| JP | 2014-525624 A | 9/2014 |
| JP | 2016-507100 A | 3/2016 |
| JP | 2017-534107 A | 11/2017 |
| JP | 2017-534967 A | 11/2017 |
| JP | 2018-503896 A | 2/2018 |
| JP | 2018-512087 A | 5/2018 |
| JP | 2018-536213 A | 12/2018 |
| KR | 10-357850 B1 | 10/2002 |
| KR | 10-2021-0019533 A | 2/2021 |
| WO | WO 2008/114454 A1 | 9/2008 |
| WO | WO 2009/137567 A1 | 11/2009 |
| WO | WO 2012/039834 A1 | 3/2012 |
| WO | WO 2012/050772 A1 | 4/2012 |
| WO | WO 2013/106257 A1 | 7/2013 |
| WO | WO 2015/078394 A1 | 6/2015 |
| WO | WO 2015/108539 A1 | 7/2015 |
| WO | WO 2015/149017 A1 | 10/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/059248 A1 | 4/2017 |
| WO | WO 2017/112526 A1 | 6/2017 |
| WO | WO 2017/172440 A1 | 10/2017 |
| WO | WO 2018/005829 A1 | 1/2018 |
| WO | WO 2018/098443 A1 | 5/2018 |
| WO | WO 2018/098445 A1 | 5/2018 |
| WO | WO 2020/005764 A1 | 1/2020 |
| WO | WO 2020/006081 A1 | 1/2020 |
| WO | WO 2020/069104 A1 | 4/2020 |
| WO | WO 2020/123439 A1 | 6/2020 |
| WO | WO 2020/264431 A1 | 12/2020 |
| WO | WO 2021/108435 A1 | 6/2021 |

OTHER PUBLICATIONS

Abebe et al., "EC-Store: Bridging the Gap Between Storage and Latency in Distribute Erasure Coded Systems", IEEE 38th International Conference on Distributed Computing Systems, 2018, pp. 255-266.

Adapter Pattern, Wikipedia, https://en.wikipedia.org/w/index.php?title=Adapter_pattern&oldid=654971255, [retrieved May 26, 2016], 6 pages.

Amazon, "AWS Lambda: Developer Guide", Jun. 26, 2016 Retrieved from the Internet, URL:http://docs.aws.amazon.com/lambda/latest/dg/lambda-dg.pdf, [retrieved on Aug. 30, 2017], 314 pages.

Amazon, "AWS Lambda: Developer Guide", Apr. 30, 2016 Retrieved from the Internet, URL: https://web.archive.org/web/20160430050158/http://docs.aws.amazon.com:80/lambda/latest/dg/lambda-dg.pdf, 346 pages.

Amazon, "AWS Lambda: Developer Guide", Retrieved from the Internet, 2019, URL : http://docs.aws.amazon.com/lambda/ latest/dg/lambda-dg.pdf, 521 pages.

Balazinska et al., Moirae: History-Enhanced Monitoring, Published: Jan. 2007, 12 pages.

Bebenita et al., "Trace-Based Compilation in Execution Environments without Interpreters," ACM, Copyright 2010, 10 pages.

Ben-Yehuda et al., "Deconstructing Amazon EC2 Spot Instance Pricing", ACM Transactions on Economics and Computation 1.3, Sep. 2013, 15 pages.

Bhadani et al., Performance evaluation of web servers using central load balancing policy over virtual machines on cloud, Jan. 2010, 4 pages.

Bryan Liston, "Ad Hoc Big Data Processing Made Simple with Serverless Map Reduce", Nov. 4, 2016, Amazon Web Services <https :/laws. amazon .com/bl ogs/compute/ad-hoc-big-data-processi ng-made-si mple-with-serverless-mapred uce >.

CodeChef ADMIN discussion web page, retrieved from https://discuss.codechef.com/t/what-are-the-memory-limit-and-stack-size-on-codechef/14159, retrieved on Sep. 10, 2019.

CodeChef IDE web page, Code, Compile & Run, retrieved from https://www.codechef.com/ide, retrieved on Sep. 9, 2019.

Czajkowski, G., and L. Daynes, Multitasking Without Compromise: A Virtual Machine Evolution 47(4a):60-73, ACM SIGPLAN Notices—Supplemental Issue, Apr. 2012.

Das et al., Adaptive Stream Processing using Dynamic Batch Sizing, Nov. 2014, 13 pages.

Deis, Container, Jun. 2014, 1 page.

Dean et al, "MapReduce: Simplified Data Processing on Large Clusters", ACM, 2008, pp. 107-113.

Dombrowski, M., et al., Dynamic Monitor Allocation in the Java Virtual Machine, JTRES '13, Oct. 9-11, 2013, pp. 30-37.

Dornemann et al., "On-Demand Resource Provisioning for BPEL Workflows Using Amazon's Elastic Compute Cloud", 9th IEEE/ACM International Symposium on Cluster Computing and the Grid, 2009, pp. 140-147.

Dynamic HTML, Wikipedia page from date Mar. 27, 2015, retrieved using the WayBackMachine, from https://web.archive.org/web/20150327215418/https://en.wikipedia.org/wiki/Dynamic_HTML, 2015, 6 pages.

Ekanayake et al, "Twister: A Runtime for Iterative MapReduce", ACM, 2010, pp. 810-818.

Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.

Fan et al., Online Optimization of VM Deployment in IaaS Cloud, Dec. 17, 2012-Dec. 19, 2012, 6 pages.

Ha et al., A Concurrent Trace-based Just-In-Time Compiler for Single-threaded JavaScript, utexas.edu, Jun. 2009.

(56) References Cited

OTHER PUBLICATIONS

Hammoud et al, "Locality-Aware Reduce Task Scheduling for MapReduce", IEEE, 2011, pp. 570-576.
Han et al., Lightweight Resource Scaling for Cloud Applications, May 13, 2012-May 16, 2012, 8 pages.
Hoffman, Auto scaling your website with Amazon Web Services (AWS)—Part 2, Cardinalpath, Sep. 2015, 15 pages.
http://discuss.codechef.com discussion web page from date Nov. 11, 2012, retrieved using the WayBackMachine, from https://web.archive.org/web/20121111040051/http://discuss.codechef.com/questions/2881 /why-are-simple-java-programs-using-up-so-much-space, 2012.
https://www.codechef.com code error help page from Jan. 2014, retrieved from https://www.codechef.com/JAN14/status/ERROR,va123, 2014.
http://www.codechef.com/ide web page from date Apr. 5, 2015, retrieved using the WayBackMachine, from https://web.archive.org/web/20150405045518/http://www.codechef.com/ide, 2015.
Huang, Zhe, Danny HK Tsang, and James She. "A virtual machine consolidation framework for mapreduce enabled computing clouds." 2012 24th International Teletraffic Congress (ITC 24). IEEE, Sep. 4, 2012-Sep. 7, 2012.
Huang et al., "Erasure Coding in Windows Azure Storege", USENIX, 2012 in 12 pages.
Kamga et al., Extended scheduler for efficient frequency scaling in virtualized systems, Jul. 2012, 8 pages.
Kato, et al. "Web Service Conversion Architecture of the Web Application and Evaluation"; Research Report from Information Processing Society, Apr. 3, 2006 with Machine Translation.
Kazempour et al., AASH: an asymmetry-aware scheduler for hypervisors, Jul. 2010, 12 pages.
Kim et al, "MRBench: A Benchmark for Map-Reduce Framework", IEEE, 2008, pp. 11-18.
Kraft et al., 10 performance prediction in consolidated virtualized environments, Mar. 2011, 12 pages.
Krsul et al., "VMPlants: Providing and Managing Virtual Machine Execution Environments for Grid Computing", Supercomputing, 2004. Proceedings of the ACM/IEEESC 2004 Conference Pittsburgh, PA, XP010780332, Nov. 6-12, 2004, 12 pages.
Lagar-Cavilla et al., "SnowFlock: Virtual Machine Cloning as a First-Class Cloud Primitive", ACM Transactions on Computer Systems, vol. 29, No. 1, Article 2, Publication date: Feb. 2011, in 45 pages.
Lin, "MR-Apriori: Association Rules Algorithm Based on MapReduce", IEEE, 2014, pp. 141-144.
Meng et al., Efficient resource provisioning in compute clouds via VM multiplexing, Jun. 2010, 10 pages.
Merkel, "Docker: Lightweight Linux Containers for Consistent Development and Deployment", Linux Journal, vol. 2014 Issue 239, Mar. 2014, XP055171140, 16 pages.
Monteil, Coupling profile and historical methods to predict execution time of parallel applications. Parallel and Cloud Computing, Jul. 2013, <hal-01228236, pp. 81-89.
Nakajima, J., et al., Optimizing Virtual Machines Using Hybrid Virtualization, SAC '11, Mar. 21-25, 2011, TaiChung, Taiwan, pp. 573-578.
Qian, H., and D. Medhi, et al., Estimating Optimal Cost of Allocating Virtualized Resources With Dynamic Demand, ITC 2011, Sep. 2011, pp. 320-321.
Rashmi et al., "EC-Cache: Load-Balance, Low-Latency Cluster Caching with Online Erasure Coding", USENIX, 2016, pp. 401-417.
Ryden et al., "Nebula: Distributed Edge Cloud for Data-Intensive Computing", IEEE, 2014, pp. 491-492.
Sakamoto, et al. "Platform for Web Services using Proxy Server"; Research Report from Information Processing Society, Mar. 22, 2002, vol. 2002, No. 31.
Search Query Report from IP.com, performed Dec. 2, 2020.
Search Query Report from IP.com, performed May 27, 2021.
Shim (computing), Wikipedia, https://en.wikipedia.org/w/index.php?title+Shim_(computing)&oldid+654971528, [retrieved on May 26, 2016], 2 pages.
Stack Overflow, Creating a database connection pool, Nov. 10, 2009, 4 pages.
Tan et al., Provisioning for large scale cloud computing services, Jun. 2012, 2 pages.
Tange, "GNU Parallel: The Command-Line Power Tool", vol. 36, No. 1, Jan. 1, 1942, pp. 42-47.
Vaghani, S.B., Virtual Machine File System, ACM SIGOPS Operating Systems Review 44(4):57-70, Dec. 2010.
Vaquero, L., et al., Dynamically Scaling Applications in the cloud, ACM SIGCOMM Computer Communication Review 41(1):45-52, Jan. 2011.
Wang et al., "Improving utilization through dynamic VM resource allocation in hybrid cloud environment", Parallel and Distributed V Systems (ICPADS), IEEE, Dec. 16, 2014-Dec. 19, 2014. Retrieved on Feb. 14, 2019, Retrieved from the internet: URL<https://ieeexplore.ieee.org/stamp/stamp.jsp?tp=&arnumber=7097814, 8 pages.
Wikipedia "API" pages from date Apr. 7, 2015, retrieved using the WayBackMachine from https://web.archive.org/web/20150407191158/https://en .wikipedia.org/wiki/Application_programming_interface.
Wikipedia List_of_HTTP status_codes web page, retrieved from https://en.wikipedia.org/wiki/List_of_HTTP status_codes, retrieved on Sep. 10, 2019.
Wikipedia Recursion web page from date Mar. 26, 2015, retrieved using the WayBackMachine, from https://web.archive.org/web/20150326230100/https://en .wikipedia.org/wiki/Recursion_(computer_science), 2015.
Wikipedia subroutine web page, retrieved from https://en.wikipedia.org/wiki/Subroutine, retrieved on Sep. 10, 2019.
Wood, Timothy, et al. "Cloud Net: dynamic pooling of cloud resources by live WAN migration of virtual machines." ACM Sigplan Notices 46.7 (2011): 121-132. (Year: 2011).
Wu et al., HC-Midware: A Middleware to Enable High Performance Communication System Simulation in Heterogeneous Cloud, Association for Computing Machinery, Oct. 20-22, 2017, 10 pages.
Yamasaki et al. "Model-based resource selection for efficient virtual cluster deployment", Virtualization Technology in Distributed Computing, ACM, Nov. 2007, pp. 1-7.
Yang, The Application of MapReduce in the Cloud Computing:, IEEE, 2011, pp. 154-156.
Yue et al., AC 2012-4107: Using Amazon EC2 in Computer and Network Security Lab Exercises: Design, Results, and Analysis, 2012, American Society for Engineering Education, Jun. 10, 2012.
Zhang et al., VMThunder: Fast Provisioning of Large-Scale Virtual Machine Clusters, IEEE Transactions on Parallel and Distributed Systems, vol. 25, No. 12, Dec. 2014, pp. 3328-3338.
Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2015/052810 dated Dec. 17, 2015.
International Preliminary Report on Patentability in PCT/US2015/052810 dated Apr. 4, 2017.
Extended Search Report in European Application No. 15846932.0 dated May 3, 2018.
Office Action in Chinese Application No. 202110268031.5, dated Sep. 3, 2021.
Office Action in Canadian Application No. 2,962,633 dated May 21, 2020.
Office Action in Canadian Application No. 2,962,633 dated Jun. 18, 2021.
Office Action in European Application No. 19199402.9 dated Mar. 23, 2021.
Office Action in European Application No. 19199402.9 dated Dec. 3, 2021 in 4 pages.
Communication Pursuant to Article 94(3) EPC in European Application No. 19199402.9 dated Apr. 19, 2022 in 5 pages.
International Search Report and Written Opinion in PCT/US2015/052838 dated Dec. 18, 2015.
International Preliminary Report on Patentability in PCT/US2015/052838 dated Apr. 4, 2017.

(56) References Cited

OTHER PUBLICATIONS

Extended Search Report in European Application No. 15847202.7 dated Sep. 3, 2018.
Extended Search Report in European Application No. 19199402.9 dated Mar. 6, 2020.
Office Action in Japanese Application No. 2017-516160 dated Jan. 15, 2018.
Notice of Allowance in Japanese Application No. 2017-516160 dated May 8, 2018.
Office Action in Canadian Application No. 2,962,631 dated May 19, 2020.
Office Action in Canadian Application No. 2,962,631 dated May 31, 2021.
Office Action in Indian Application No. 201717013356 dated Jan. 22, 2021.
Office Action in Japanese Application No. 2017-516168 dated Mar. 26, 2018.
International Search Report and Written Opinion in PCT/US2015/052833 dated Jan. 13, 2016.
International Preliminary Report on Patentability in PCT/US2015/052833 dated Apr. 4, 2017.
Extended Search Report in European Application No. 15846542.7 dated Aug. 27, 2018.
Office Action in Indian Application No. 201717019903 dated May 18, 2020.
International Search Report and Written Opinion in PCT/US2015/064071 dated Mar. 16, 2016.
International Preliminary Report on Patentability in PCT/US2015/064071 dated Jun. 6, 2017.
Office Action in Australian Application No. 2016215438 dated Feb. 26, 2018.
Notice of Allowance in Australian Application No. 2016215438 dated Nov. 19, 2018.
Office Action in Canadian Application No. 2,975,522 dated Jun. 5, 2018.
Notice of Allowance in Canadian Application No. 2,975,522 dated Mar. 13, 2020.
Office Action in Indian Application No. 201717027369 dated May 21, 2020.
International Search Report and Written Opinion in PCT/US2016/016211 dated Apr. 13, 2016.
International Preliminary Report on Patentability in PCT/US2016/016211 dated Aug. 17, 2017.
Office Action in Chinese Application No. 201680020768.2 dated May 14, 2021 in 23 pages.
Office Action in Chinese Application No. 201680020768.2 dated Sep. 24, 2021 in 20 pages.
Decision to refuse a European Patent Application in European Patent Application No. 16716797.2 dated Dec. 20, 2021 in 20 pages.
First Examination Report for Indian Application No. 201717034806 dated Jun. 25, 2020.
International Search Report and Written Opinion in PCT/US2016/026514 dated Jun. 8, 2016.
International Preliminary Report on Patentability in PCT/US2016/026514 dated Oct. 10, 2017.
International Search Report and Written Opinion in PCT/US2016/026520 dated Jul. 5, 2016.
International Preliminary Report on Patentability in PCT/US2016/026520 dated Oct. 10, 2017.
Office Action in Chinese Application No. 2016800562398 dated Jun. 18, 2021.
International Search Report and Written Opinion in PCT/US2016/054774 dated Dec. 16, 2016.
Office Action in European Application No. 16781265.0 dated Jul. 13, 2020.
Office Action in Indian Application No. 201817013748 dated Nov. 20, 2020.
International Preliminary Report on Patentability in PCT/US2016/054774 dated Apr. 3, 2018.
Office Action in Chinese Application No. 201680072794.X dated Jun. 22, 2021.
Office Action in European Application No. 16823419.3 dated Mar. 12, 2021.
Office Action in European Application No. 16823419.3 dated May 20, 2022 in 6 pages.
International Search Report and Written Opinion in PCT/US2016/066997 dated Mar. 20, 2017.
International Preliminary Report on Patentability in PCT/US2016/066997 dated Jun. 26, 2018.
Office Action in Chinese Application No. 201780022789.2 dated Apr. 28, 2021.
Office Action in European Application No. 17776325.7 dated Apr. 12, 2021.
International Search Report and Written Opinion in PCT/US/2017/023564 dated Jun. 6, 2017.
International Preliminary Report on Patentability in PCT/US/2017/023564 dated Oct. 2, 2018.
First Office Action in Chinese Application No. 2017800451968 dated May 26, 2021.
Second Office Action in Chinese Application No. 2017800451968 dated Dec. 3, 2021 in 20 pages.
Office Action in European Application No. 17740533.9 dated May 4, 2021.
International Search Report and Written Opinion in PCT/US2017/040054 dated Sep. 21, 2017.
International Preliminary Report on Patentability in PCT/US2017/040054 dated Jan. 1, 2019.
International Search Report and Written Opinion in PCT/US2017/039514 dated Oct. 10, 2017.
International Preliminary Report on Patentability in PCT/US2017/039514 dated Jan. 1, 2019.
Extended European Search Report in application No. 17776325.7 dated Oct. 23, 2019.
Office Action in European Application No. 17743108.7 dated Jan. 14, 2020.
Office Action in European Application No. 17743108.7 dated Dec. 22, 2020.
Office Action in European Application No. 19740451.0 dated Jun. 13, 2022 in 4 pages.
Office Action in Japanese Application No. 2020-572443 dated Feb. 28, 2022.
Office Action in Korean Application No. 10-2021-7000975 dated Mar. 31, 2022 in 12 pages.
International Search Report and Written Opinion dated Oct. 15, 2019 for International Application No. PCT/US2019/039246 in 16 pages.
International Preliminary Report on Patentability dated Dec. 29, 2020 for International Application No. PCT/US2019/039246 in 8 pages.
Office Action in Japanese Application No. 2020-572441 dated Dec. 22, 2021 in 8 pages.
International Search Report for Application No. PCT/US2019/038520 dated Aug. 14, 2019.
International Preliminary Report on Patentability for Application No. PCT/US2019/038520 dated Dec. 29, 2020.
Office Action in Japanese Application No. 2021-517335 dated May 16, 2022.
International Preliminary Report on Patentability and Written Opinion in PCT/US2019/053123 dated Mar. 23, 2021.
International Search Report and Written Opinion in PCT/US2019/053123 dated Jan. 7, 2020.
International Search Report for Application No. PCT/US2019/065365 dated Mar. 19, 2020.
International Preliminary Report on Patentability for Application No. PCT/US2019/065365 dated Jun. 8, 2021.
International Search Report for Application No. PCT/US2020/039996 dated Oct. 8, 2020.
International Preliminary Report on Patentability for Application No. PCT/US2020/039996 dated Jan. 6, 2022.
International Search Report for Application No. PCT/US2020/062060 dated Mar. 5, 2021.

(56) References Cited

OTHER PUBLICATIONS

International Preliminary Report on Patentability for Application No. PCT/US2020/062060 dated Jun. 9, 2022 in 9 pages.
Anonymous: "Amazon Elastic Compute Cloud User Guide for Linux Instances—first 400 pages of 795," Apr. 8, 2016 (Apr. 8, 2016_, XP055946665, Retrieved from the Internet: URL:https://web.archive.org/web/20160408211543if_/http://docs.aws.amazon.com/AWSEC2/latest/UserGuide/ec2-ug.pdf (retrieved on Jul. 27, 2022] 795 pages.
Anonymous: "Amazon Simple Workflow Service Developer Guide API Version Jan. 25, 2012," Jun. 11, 2016 (Jun. 11, 2016), XP055946928, Retrieved from the Internet: URL:https://web.archive.org/web/20160111075522if_/http://docs.aws.amazon.com/amazonswf/latest/developerguide/swf-dg.pdf [retrieved on Jul. 28, 2022] in 197 pages.
Anonymous: "AWS Flow Framework for Java," Apr. 7, 2016 (Apr. 7, 2016), XP055946535, Retrieved from the Internet: URL:https://web.archive.org/web/20160407214715if_/http://docs.aws.amazon.com/amazonswf/latest/awsflowguide/swf-aflow.pdf, [retrieved Jul. 27, 2022] in 139 pages.
European Examination Report, re EP Application No. 17743108.7, dated Oct. 12, 2022.
Examination Report for EP Application No. 19828515.7 dated Dec. 6, 2022.
U.S. Appl. No. 16/808,237, Dynamically Reallocating Memory in an On-Demand Code Execution System, filed Mar. 3, 2020.

\* cited by examiner

RECLAIMING COMPUTING RESOURCES IN AN ON-DEMAND CODE EXECUTION SYSTEM

BACKGROUND

Computing devices can utilize communication networks to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, hosted computing environments or data processing centers, generally referred to herein as "data centers," may include a number of interconnected computing systems to provide computing resources to users of the data center. The data centers may be private data centers operated on behalf of an organization, or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computing resources from a data center, such as single computing devices or a configuration of networked computing devices, and be provided with varying numbers of virtual machine resources.

In some scenarios, a user can request that a data center provide computing resources to execute a particular task. The task may correspond to a set of computer-executable instructions, which the data center may then execute on behalf of the user. The data center may thus further facilitate increased utilization of data center resources.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
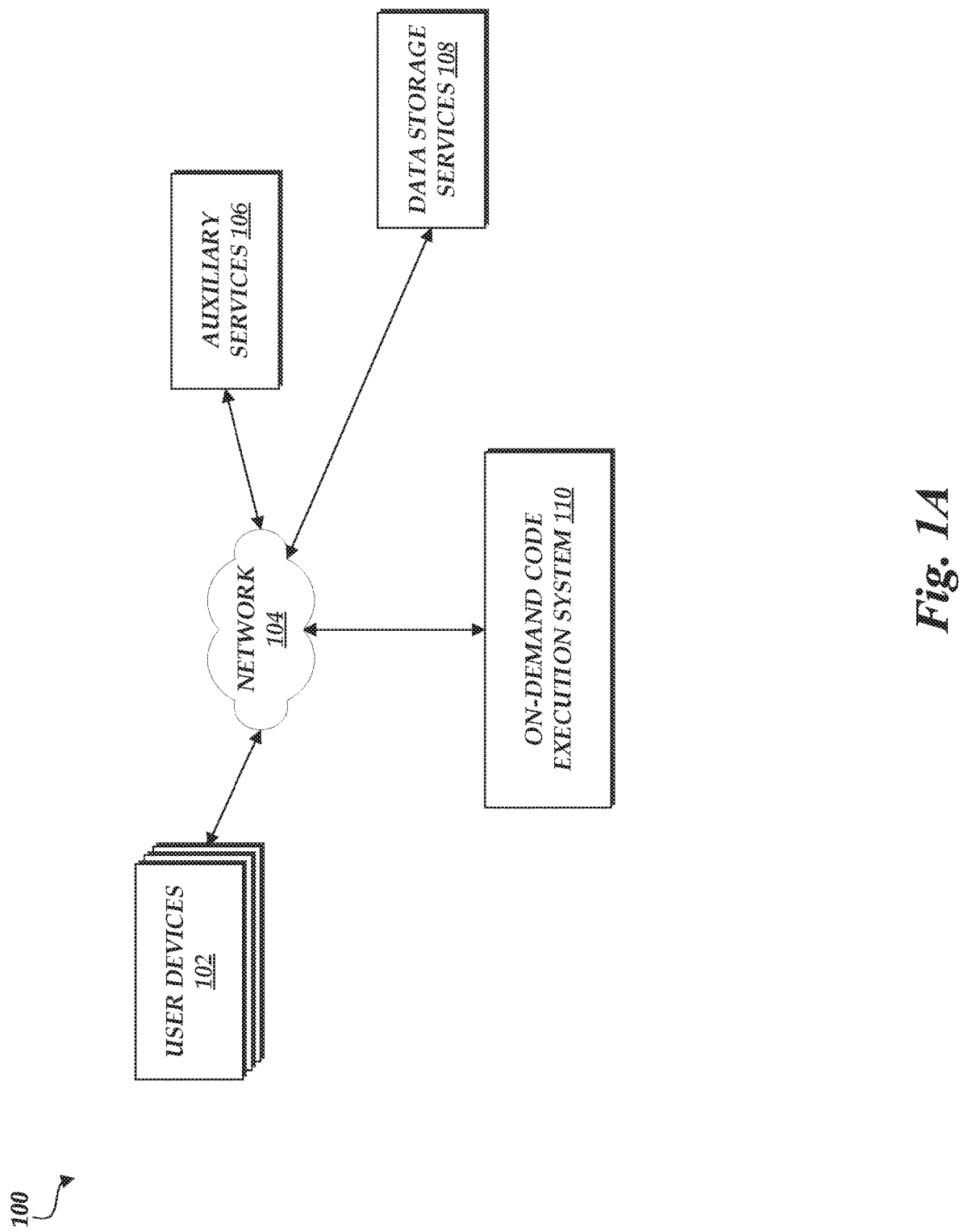
FIGS. 1A and 1B are block diagrams depicting an illustrative environment in which an on-demand code execution system can execute tasks corresponding to code, which may be submitted by users of the on-demand code execution system, and can reclaim computing resources used to execute the tasks in accordance with aspects of the present disclosure.

Generally described, aspects of the present disclosure relate to an on-demand code execution system. The on-demand code execution system enables rapid execution of code, which may be supplied by users of the on-demand code execution system. More specifically, aspects of the present disclosure relate to improving the performance of an on-demand code execution system by implementing a reclaimable resource system, which may reclaim idle or unused computing resources associated with on-demand execution of computer-executable code.

As described in detail herein, an on-demand code execution system may provide a network-accessible service enabling users to submit or designate computer-executable code to be executed by virtual machine instances on the on-demand code execution system. Each set of code on the on-demand code execution system may define a "task," and may implement specific functionality corresponding to that task when executed on a virtual machine instance of the on-demand code execution system. Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds), thus enabling execution of tasks in "real-time" (e.g., with little or no perceptible delay to an end user).

The on-demand code-execution system may thus allow users to execute code in a serverless environment (e.g., one in which the underlying server is not under user control). The term "serverless environment," as used herein, is intended to refer to an environment in which responsibility for managing generation, configuration, and state of an underlying execution environment is abstracted away from a user, such that the user need not, for example, create the execution environment, install an operating system within the execution environment, or manage a state of the environment in order to execute desired code in the environment. Similarly, the term "server-based environment" is intended to refer to an environment in which a user is at least partly responsible for managing generation, configuration, or state of an underlying execution environment in addition to executing desired code in the environment. One skilled in the art will thus appreciate that "serverless" and "server-based" may indicate the degree of user control over execution environments in which code is executed, rather than the actual absence or presence of a server.

As described in more detail below, the on-demand code execution system may include a worker manager configured to receive user code (threads, programs, etc., composed in any of a variety of programming languages) and execute the code in a highly scalable, low latency manner, without requiring user configuration of a virtual machine instance. Specifically, the worker manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the worker manager receives user-initiated requests to execute code, and identifies a pre-configured virtual machine instance to execute the code based on configuration information associated with the request. The worker manager can further allocate the identified virtual machine instance to execute the user's code at least partly by creating and configuring containers inside the allocated virtual machine instance, and provisioning the containers with code of the task as well as a dependency code objects. Various embodiments for implementing a worker manager and executing user code on virtual machine instances is described in more detail in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 Patent"), the entirety of which is hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used as well.

While a virtual machine instance executing an operating system is described herein as one example of an execution environment, other execution environments are also possible. For example, tasks or other processes may be executed within a software "container," which provides an isolated runtime environment without itself providing virtualization of hardware. Containers may be implemented within virtual machines to provide additional security, or may be run outside of a virtual machine instance.

The on-demand code execution system may therefore include a number of host computing devices, which host virtual machine instances executing tasks on behalf of users. These virtual machine instances may be provisioned with various computing resources, such as computer memory, processors, processing time, data stores, network bandwidth, and the like. These computing resources are typically allocated to the virtual machine instance when it is created, and are then utilized to execute the tasks. However, a task may only utilize a portion of the computing resources allocated to the virtual machine instance it is executed upon, or may utilize a computing resource for some length of time and then cease to do so. For example, a virtual machine instance may cease or reduce its utilization of memory because it has completed execution of a user-submitted task. As a further example, a virtual machine instance may execute a user-submitted task having a first phase that consumes a significant amount of network bandwidth, followed by a second phase that consumes little to no bandwidth and instead consumes significant amounts of memory and processing time. The computing resources allocated to a virtual machine instance may thus be underutilized.

Additionally, in some embodiments, a host computing device may provision and allocate computing resources to virtual machine instances prior to receiving requests to execute tasks. Illustratively, provisioning and configuring a virtual machine instance may take time, and the on-demand code execution system may thus pre-provision virtual machine instances to avoid delaying execution of a user-submitted task. However, allocating resources to a virtual machine instance before knowing what computing resources are needed for a particular task may require the host computing device to err on the side of providing too many resources, which may lead to inefficiency. In some embodiments, the host computing device may provision a pool of virtual machine instances with various resource allocations, and then determine a "best fit" between an incoming request to execute a task and the available virtual machine instances. However, it may be difficult to predict the right mix of virtual machine instance capacities, and an incorrect prediction may lead to a pool stocked with virtual machine instances that are "too big" (e.g., instances that have more computing resources than are needed for most of the incoming tasks) or "too small" (e.g., instances that are underused because they do not have sufficient computing resources to execute most of the incoming tasks).

A host computing device may thus allocate computing resources to virtual machine instances, and these computing resources may become idle or underutilized (e.g., because the virtual machine instance does not need them, or because the virtual machine instance itself is idle or underutilized). However, in some embodiments, the host computing device may lack visibility into whether a virtual machine instance is efficiently using the computing resources allocated to it, or whether these computing resources could be reclaimed and reallocated to another virtual machine instance without significantly disrupting execution of a user-submitted task. The host computing device may therefore allocate computing resources to virtual machine instances inefficiently, and as a result the host computing device may not be able to execute as many user-submitted tasks as it otherwise could. In other embodiments, the host computing device may have the capability to determine whether a virtual machine instance is using its allocated computing resources efficiently, but using this capability may significantly increase the overhead consumption of computing resources on the host computing device, and thereby reduce the amount of computing resources that the host computing device can make available to virtual machine instances.

In some embodiments, it may be desirable to change the allocation of computing resources to an existing virtual machine instance. For example, a user of the on-demand code execution system may request an increase or decrease to the computing resources allocated to a virtual machine instance that is executing the user's task. As a further example, the on-demand code execution system may determine that a particular virtual machine instance is under- or over-resourced relative to the tasks it will be executing. However, it may be difficult or inefficient to modify an existing virtual machine instance without interrupting its availability or disrupting the execution of tasks. For example, an operating system on the virtual machine instance may require reconfiguration in order to process a change in allocated resources (e.g., to recognize an increase or reduction in available memory).

To address these issues, an operator of an on-demand code execution system may implement a reclaimable resource system as described herein. The reclaimable resource system may, in some embodiments, implement reclaimable resource identification as a process within a virtual machine instance, and may prioritize reclamation of computing resources based on the measured or predicted workloads of virtual machine instances executing user-submitted tasks. The reclaimable resource identification system may also prioritize and schedule reclamation of computing resources based on resource demand, such that reclamation tasks are scheduled when computing resources are available to execute them, or when measured or predicted demand for computing resources indicates a potential resource bottleneck (e.g., that the host computing device is running low on free memory, and soon will be unable to provision more virtual machine instances). In other embodiments, the reclaimable resource system may enable more efficient configuration and reconfiguration of virtual machine instances on demand.

While a number embodiments described herein include a "balloon" process that identifies reclaimable memory by "inflating" and "deflating," it will be understood that the present disclosure is not limited to a particular process for identifying reclaimable computing resources or to identifying a particular computing resource as reclaimable. For example, embodiments of the present disclosure include identifying reclaimable computing resources such as processors, processing time, data stores, network bandwidth, and the like. As a further example, embodiments of the present disclosure include identifying reclaimable computing resources based on utilization of the computing resources, utilization of other computing resources (e.g., utilization of backing stores), predicted demand, or other criteria.

As will be appreciated by one of skill in the art in light of the present disclosure, the embodiments disclosed herein improve the ability of computing systems, such as on-demand code execution systems, to execute code in an efficient manner. Moreover, the presently disclosed embodiments address technical problems inherent within computing systems; specifically, the problem of efficiently allocating computing resources to virtual machine instances that execute tasks on demand in an on-demand code execution system. These technical problems are addressed by the various technical solutions described herein, including the implementation of a reclaimable resource system within an on-demand code execution system to improve the performance and capacity of the on-demand code execution system. Thus, the present disclosure represents an improvement on existing data processing systems and computing systems in general.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain embodiments. Furthermore, various embodiments may include several novel features, no single one of which is solely responsible for its desirable attributes or which is essential to practicing the embodiments herein described.

FIG. 1A is a block diagram of an illustrative operating environment 100 in which an on-demand code execution system 110 may operate based on communication with user computing devices 102, auxiliary services 106, and network-based data storage services 108. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the user computing devices 102 with one or more user interfaces, command-line interfaces (CLIs), application programing interfaces (APIs), and/or other programmatic interfaces for generating and uploading user-executable code (including metadata identifying dependency code objects for the uploaded code), invoking the user-provided code (e.g., submitting a request to execute the user code on the on-demand code execution system 110), scheduling event-based jobs or timed jobs, tracking the user-provided code, and/or viewing other logging or monitoring information related to their requests and/or user code. Although one or more embodiments may be described herein as using a user interface, it should be appreciated that such embodiments may, additionally or alternatively, use any CLIs, APIs, or other programmatic interfaces.

The illustrative environment 100 further includes one or more network-based data storage services 108, which are configured to enable the on-demand code execution system 110 to store and retrieve data from one or more persistent or substantially persistent data sources. Illustratively, the network-based data storage services 108 may enable the on-demand code execution system 110 to store information corresponding to a task, such as code or metadata, to store additional code objects representing dependencies of tasks, to retrieve data to be processed during execution of a task, and to store information (e.g., results) regarding that execution. The network-based data storage services 108 may represent, for example, a relational or non-relational database. In another example, the network-based data storage services 108 may represent a network-attached storage (NAS), configured to provide access to data arranged as a file system. The network-based data storage services 108 may further enable the on-demand code execution system 110 to query for and retrieve information regarding data stored within the on-demand code execution system 110, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The user computing devices 102, auxiliary services 106, and network-based data storage services 108 may communicate with the on-demand code execution system 110 via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In the example of FIG. 1A, the on-demand code execution system 110 is illustrated as connected to the network 104. In some embodiments, any of the components within the on-demand code execution system 110 can communicate with other components of the on-demand code execution system 110 via the network 104. In other embodiments, not all components of the on-demand code execution system 110 are capable of communicating with other components of the operating environment 100. In one example, only the frontend 120 depicted in FIG. 1B (which may in some instances represent multiple frontends 120) may be connected to the network 104, and other components of the on-demand code execution system 110 may communicate with other components of the environment 100 via the frontends 120.

In FIG. 1A, users, by way of user computing devices 102, may interact with the on-demand code execution system 110 to provide executable code, and establish rules or logic defining when and how such code should be executed on the on-demand code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code. The on-demand code execution system 110 can handle the acquisition and configuration of compute capacity (e.g., containers, instances, etc., which are described in greater detail below) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus over-paying). In accordance with embodiments of the present disclosure, and as described in more detail below, the on-demand code execution system 110 may configure the virtual machine instances with customized operating systems to execute the user's code more efficiency and reduce utilization of computing resources.

Figure 1B:
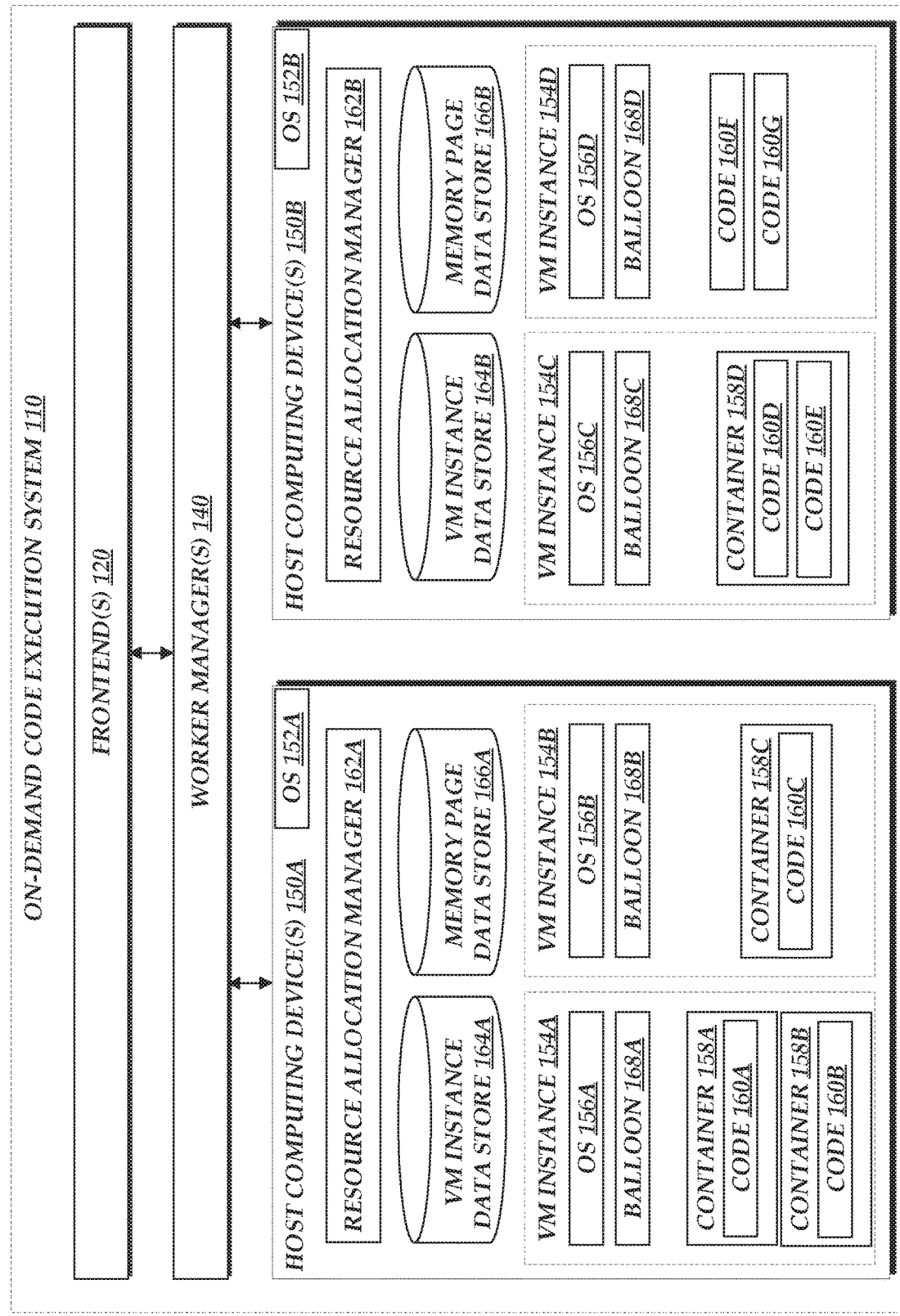

With reference now to FIG. 1B, the on-demand code execution system 110 is depicted as operating in a distributed computing environment including several computer systems that are interconnected using one or more computer networks (not shown in FIG. 1B). The on-demand code execution system 110 could also operate within a computing environment having a fewer or greater number of devices than are illustrated in FIG. 1B. Thus, the depiction of the on-demand code execution system 110 in FIG. 1B should be taken as illustrative and not limiting to the present disclosure. For example, the on-demand code execution system 110 or various constituents thereof could implement various Web services components, hosted or "cloud" computing environments, and/or peer to peer network configurations to implement at least a portion of the processes described herein.

Further, the on-demand code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

To enable interaction with the on-demand code execution system 110, the system 110 includes one or more frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of executing computer executable code. The frontends 120 include a variety of components to enable interaction between the on-demand code execution system 110 and other computing devices. For example, each frontend 120 may include a request interface providing user computing devices 102 with the ability to upload or otherwise communication user-specified code to the on-demand code execution system 110 and to thereafter request execution of that code. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code (including, e.g., compiling code, interpreting code, or otherwise making the code executable) are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 110) prior to the request being received by the on-demand code execution system 110. As noted above, the code for a task may reference additional code objects maintained at the on-demand code execution system 110 by use of identifiers of those code objects, such that the code objects are combined with the code of a task in an execution environment prior to execution of the task. The on-demand code execution system 110 may vary its execution strategy for a task based on where the code of the task is available at the time a call for the task is processed. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface.

A call to execute a task may specify one or more third-party libraries (including native libraries) to be used along with the user code corresponding to the task. In one embodiment, the call may provide to the on-demand code execution system 110 a file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 110 (e.g., standard routines), and/or provided by third parties. Illustratively, code not included within a call or previously uploaded by the user may be referenced within metadata of the task by use of a URI associated with the code. In some embodiments, such resource-level constraints (e.g., how much memory is to be allocated for executing a particular user code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network). In some embodiments, individual code objects may also be associated with permissions or authorizations. For example, a third party may submit a code object and designate the object as readable by only a subset of users. The on-demand code execution system 110 may include functionality to enforce these permissions or authorizations with respect to code objects.

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 110 may inspect the call and look for the flag or the header, and if it is present, the on-demand code execution system 110 may modify the behavior (e.g., logging facilities) of the container in which the task is executed, and cause the output data to be provided back to the user. In some embodiments, the behavior/mode indicators are added to the call by the user interface provided to the user by the on-demand code execution system 110. Other features such as source code profiling, remote debugging, etc. may also be enabled or disabled based on the indication provided in a call.

To manage requests for code execution, the frontend 120 can include an execution queue (not shown in FIG. 1B), which can maintain a record of requested task executions. Illustratively, the number of simultaneous task executions by the on-demand code execution system 110 is limited, and as such, new task executions initiated at the on-demand code execution system 110 (e.g., via an API call, via a call from an executed or executing task, etc.) may be placed on the execution queue and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. In other instances, the on-demand code execution system 110 may execute tasks immediately or substantially immediately after receiving a call for that task, and thus, the execution queue may be omitted.

As noted above, tasks may be triggered for execution at the on-demand code execution system 110 based on explicit calls from user computing devices 102 (e.g., as received at the request interface). Alternatively or additionally, tasks may be triggered for execution at the on-demand code execution system 110 based on data retrieved from one or more auxiliary services 106 or network-based data storage services 108. To facilitate interaction with auxiliary services 106, the frontend 120 can include a polling interface (not shown in FIG. 1B), which operates to poll auxiliary services 106 or data storage services 108 for data. Illustratively, the polling interface may periodically transmit a request to one or more user-specified auxiliary services 106 or data storage services 108 to retrieve any newly available data (e.g., social network "posts," news articles, files, records, etc.), and to determine whether that data corresponds to a user-established criteria triggering execution a task on the on-demand code execution system 110. Illustratively, criteria for execution of a task may include, but is not limited to, whether new data is available at the auxiliary services 106 or data storage services 108, the type or content of the data, or timing information corresponding to the data. In some instances, the auxiliary services 106 or data storage services 108 may function to notify the frontend 120 of the availability of new data, and thus the polling service may be unnecessary with respect to such services.

In addition to tasks executed based on explicit user calls and data from auxiliary services 106, the on-demand code execution system 110 may in some instances operate to trigger execution of tasks independently. For example, the on-demand code execution system 110 may operate (based on instructions from a user) to trigger execution of a task at each of a number of specified time intervals (e.g., every 10 minutes).

The frontend 120 can further include an output interface (not shown in FIG. 1B) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

In some embodiments, the on-demand code execution system 110 may include multiple frontends 120. In such embodiments, a load balancer (not shown in FIG. 1B) may be provided to distribute the incoming calls to the multiple frontends 120, for example, in a round-robin fashion. In some embodiments, the manner in which the load balancer distributes incoming calls to the multiple frontends 120 may be based on the location or state of other components of the on-demand code execution system 110. For example, a load balancer may distribute calls to a geographically nearby frontend 120, or to a frontend with capacity to service the call. In instances where each frontend 120 corresponds to an individual instance of another component of the on-demand code execution system, such as the active pool 140A described below, the load balancer may distribute calls according to the capacities or loads on those other components. As will be described in more detail below, calls may in some instances be distributed between frontends 120 deterministically, such that a given call to execute a task will always (or almost always) be routed to the same frontend 120. This may, for example, assist in maintaining an accurate execution record for a task, to ensure that the task executes only a desired number of times. While distribution of calls via a load balancer is illustratively described, other distribution techniques, such as anycast routing, will be apparent to those of skill in the art.

To execute tasks, the on-demand code execution system 110 includes one or more worker managers 140 that manage the instances used for servicing incoming calls to execute tasks. In the example illustrated in FIG. 1B, each worker manager 140 manages an active pool of virtual machine instances 154A-D, which are currently assigned to one or more users and are implemented by one or more physical host computing devices 150A-B. The physical host computing devices 150A-B and the virtual machine instances 154A-D may further implement one or more containers 158A-D, which may contain and execute one or more user-submitted codes 160A-G. Containers are logical units created within a virtual machine instance, or on a host computing device, using the resources available on that instance or device. For example, each worker manager 140 may, based on information specified in a call to execute a task, create a new container or locate an existing container 158A-D and assign the container to handle the execution of the task. Each container may correspond to an execution environment for the task, providing at least some isolation from other execution environments. For example, each container may provide a file system isolated from other file systems on the device, and code executing in the container may have limited or no access to other file systems or memory space associated with code executing outside of the container. In some embodiments, the virtual machine instances 154A-D may execute one or more user-submitted codes, such as user-submitted codes 160F-G, without implementing a container.

The containers 158A-D, virtual machine instances 154A-D, and host computing devices 150A-B may further include language runtimes, code libraries, or other supporting functions (not depicted in FIG. 1) that facilitate execution of user-submitted code 160A-G. The physical computing devices 150A-B and the virtual machine instances 154A-D may further include operating systems 152A-B and 156A-D. In various embodiments, operating systems 152A-B and 156A-D may be the same operating system, variants of the same operating system, different operating systems, or combinations thereof.

Although the virtual machine instances 154A-D are described here as being assigned to a particular user, in some embodiments, an instance 154A-D may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker managers 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution system 110). In some embodiments, the requests associated with the same user group may share the same containers (e.g., if the user codes associated therewith are identical). In some embodiments, a task does not differentiate between the different users of the group and simply indicates the group to which the users associated with the task belong.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus the frontend 120 may pass most or all requests to that worker manager 140. In another embodiment, a frontend 120 may include a location selector configured to determine a worker manager 140 to which to pass the execution request. In one embodiment, the location selector may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

As shown in FIG. 1B, various combinations and configurations of host computing devices 150A-B, virtual machine instances 154A-D, and containers 158A-D may be used to facilitate execution of user submitted code 160A-G. In the illustrated example, the host computing device 150A implements two virtual machine instances 154A and 154B. Virtual machine instance 154A, in turn, implements two containers 158A and 158B, which contain user-submitted code 160A and 160B respectively. Virtual machine instance 154B implements a single container 158C, which contains user-submitted code 160C. The host computing device 150B further implements two virtual machine instances 154C and 154D; the virtual machine instance 154C implements container 158D, which contains user-submitted codes 160D and 160E, and the virtual machine instance 154D directly contains user-submitted codes 160F and 160G. It will be understood that these embodiments are illustrated for purposes of example, and that many other embodiments are within the scope of the present disclosure.

In the illustrated embodiment, the host computing devices 150A and 150B include a resource allocation manager 162A and 162B respectively. Illustratively, the resource allocation managers 162A and 162B may manage the allocation and reallocation of computing resources to the virtual machine instances 154A-D, and may communicate with reclaimable resource identification processes 168A-D. In some embodiments, the reclaimable resource identification processes 168A-D may be described herein as "balloon processes" or "balloons," and their functionality may be described in terms of "inflating" or "deflating," as described in more detail below with reference to FIGS. 2A-2D. The host computing devices 150A and 150B further respectively include a virtual machine instance data store 164A and 164B, and a memory page data store 166A and 166B. The data stores 164A, 164B, 166A, and 166B may generally be any non-transitory computer-readable data store, including but not limited to hard drives, solid state devices, magnetic media, flash memory, and the like. In some embodiments, the data stores 164A, 164B, 166A, and 166B may be implemented as databases, web services, or cloud computing services. Illustratively, the virtual machine instance data stores 164A and 164B may store information regarding virtual machine instances that have been provisioned on the host computing devices 150A and 150B, and the memory page data stores 166A and 166B may provide backing for memory pages assigned to the virtual machine instances 154A-D.

While some functionalities are generally described herein with reference to an individual component of the on-demand code execution system 110, other components or a combination of components may additionally or alternatively implement such functionalities. For example, a worker manager 140 may operate to provide functionality associated with execution of user-submitted code as described herein with reference to the resource allocation managers 162A and 162B.

FIGS. 2A, 2B, 2C, and 2D depict a general architecture of a computing system (referenced as host computing device 150) that operates to execute user-submitted tasks within the on-demand code execution system 110 and to implement a reclaimable resource system in accordance with aspects of the present disclosure. The general architecture of the host computing device 150 depicted in FIGS. 2A, 2B, 2C, and 2D includes an arrangement of computer hardware and software modules that may be used to implement aspects of the present disclosure. The hardware modules may be implemented with physical electronic devices, as discussed in greater detail below. The host computing device 150 may include many more (or fewer) elements than those shown in FIGS. 2A, 2B, 2C, and 2D. It is not necessary, however, that all of these generally conventional elements be shown in order to provide an enabling disclosure. Additionally, the general architecture illustrated in FIGS. 2A, 2B, 2C, and 2D may be used to implement one or more of the other components illustrated in FIGS. 1A-B.

Figure 2A:
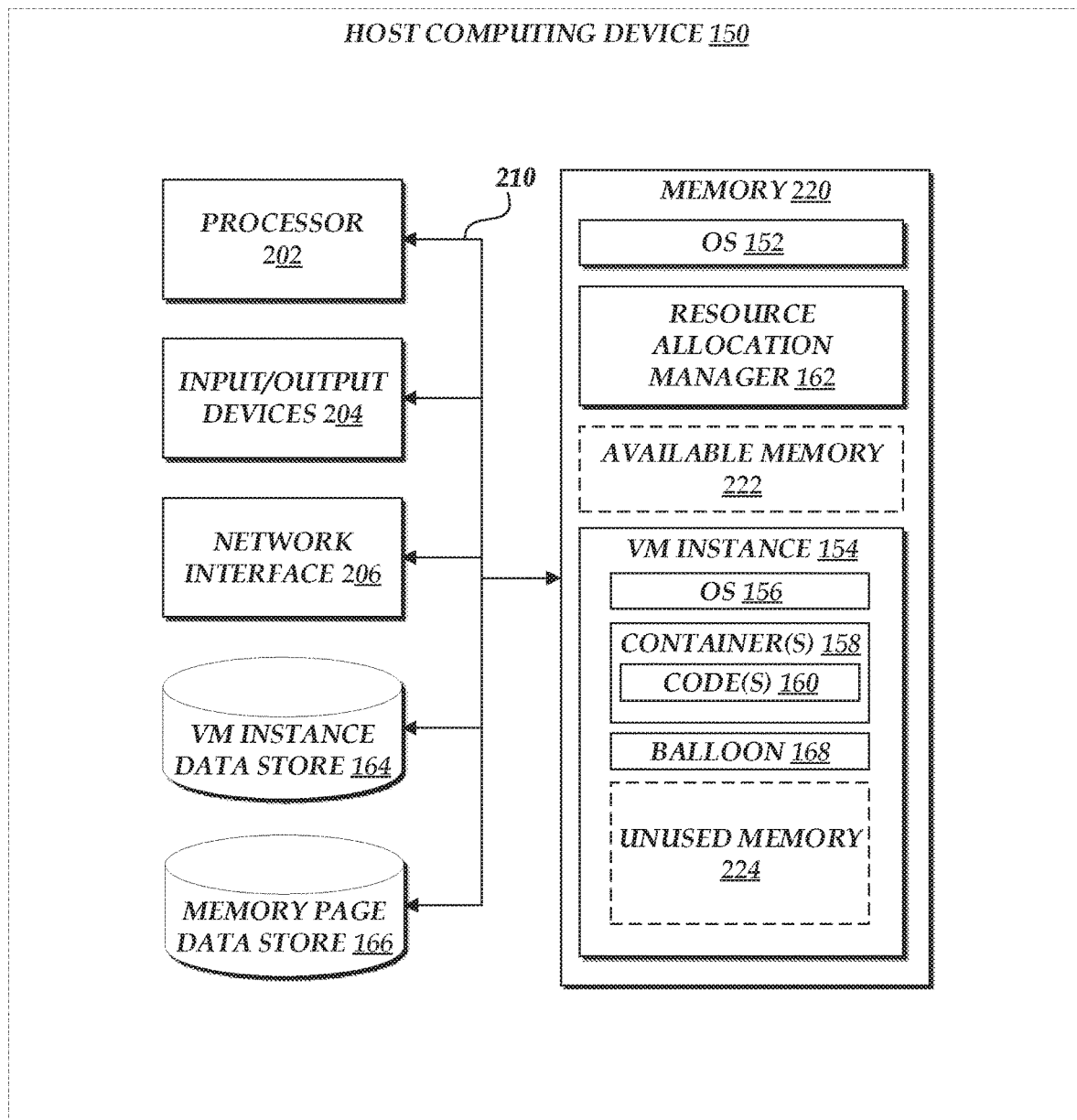
FIGS. 2A, 2B, 2C, and 2D depict a general architecture of a host computing device that is used by an on-demand code execution system to execute tasks on demand, and depict provisioning and reclaiming computing resources from the virtual machine instances in accordance with aspects of the present disclosure.

With reference now to FIG. 2A, the host computing device 150 includes a processor 202, input/output device interfaces 204, a network interface 206, the virtual machine instance data store 164, and the memory page data store 166, all of which may communicate with one another by way of a communication bus 210. The network interface 206 may provide connectivity to one or more networks or computing systems. The processor 202 may thus receive information and instructions from other computing systems or services via the network 104. The processor 202 may also communicate to and from a memory 220 and further provide output information for an optional display (not shown) via the input/output device interfaces 204. The input/output device interfaces 204 may also accept input from an optional input device (not shown). The virtual machine instance data store 164 and the memory page data store 166 may generally be any non-transitory computer-readable data stores, including but not limited to hard drives, solid state devices, magnetic media, flash memory, and the like. In some embodiments, the virtual machine instance data store 164 and the memory page data store 166 may be implemented as databases, web services, or cloud computing services, and may be external to the host computing device 150 (e.g., the data storage services 108 depicted in FIG. 1A). Additionally, in various embodiments, the virtual machine instance data store 164 and the memory page data store 166 may be implemented as a single data store or distributed across multiple data stores.

The memory 220 may contain computer program instructions (grouped as modules in some embodiments) that the processor 202 executes in order to implement one or more aspects of the present disclosure. The memory 220 generally includes random access memory (RAM), read only memory (ROM) and/or other persistent, auxiliary or non-transitory computer readable media. The memory 220 may store an operating system 152 that provides computer program instructions for use by the processor 202 in the general administration and operation of the host computing device 150. The memory 220 may further include computer program instructions and other information for implementing aspects of the present disclosure. For example, in one embodiment, the memory 220 includes an interface module (not shown) that generates interfaces (and/or instructions therefor) for interacting with the frontends 120, worker managers 140, or other computing devices, e.g., via an API, CLI, and/or Web interface. In addition, the memory 220 may include and/or communicate with one or more data repositories (not shown), for example, to access user program codes and/or libraries.

In the illustrated embodiment, the memory 220 includes available memory 222, which is a portion of the memory 220 that is available to be allocated to new or existing processes on the host computing device. The size of the available memory 222 may increase or decrease as the resource allocation manager 162 allocates (or reallocates) resources to virtual machine instances 154, which may be created as environments for executing user-submitted tasks. In the illustrated embodiment, a single virtual machine instance 154 is depicted. However, it will be understood that any number of virtual machine instances 154 may be created provided that sufficient amounts of available memory 222 and other computing resources are available. Each virtual machine instance 154 may include an operating system 156, which in various embodiments may be the same operating system as the operating system 152 used by the host computing device 150, a different version of the same operating system 152, or an entirely different operating system. Each virtual machine instance 154 may further include one or more containers 158, which may each contain one or more user-submitted codes 160 to be executed on behalf of a user of the on-demand code execution system 110.

In some embodiments, a virtual machine instance 154 may further include a reclaimable memory identification process or "balloon" process 168, whose operation is described in more detail below. The virtual machine instance 154 may also include unused memory 224, all or part of which may be identified as reclaimable memory and reclaimed as described below. In various embodiments, unused memory 224 may include memory allocated to the virtual machine instance 154 that has not been used, was not accessed for a threshold amount of time, was used and then released, or is in other reclaimable states. In some embodiments, all or some of the functionality of the balloon process 168 may be implemented by the resource allocation manager 162, the operating systems 152 and 156, or another process.

In some embodiments, the host computing device 150 may further include components other than those illustrated in FIG. 2A. For example, the memory 220 may further include information regarding pending requests to execute user-submitted tasks, timing information regarding previously executed tasks, or other information that facilitates reclaiming computing resources. FIG. 2A is thus understood to be illustrative but not limiting.

Figure 2B:
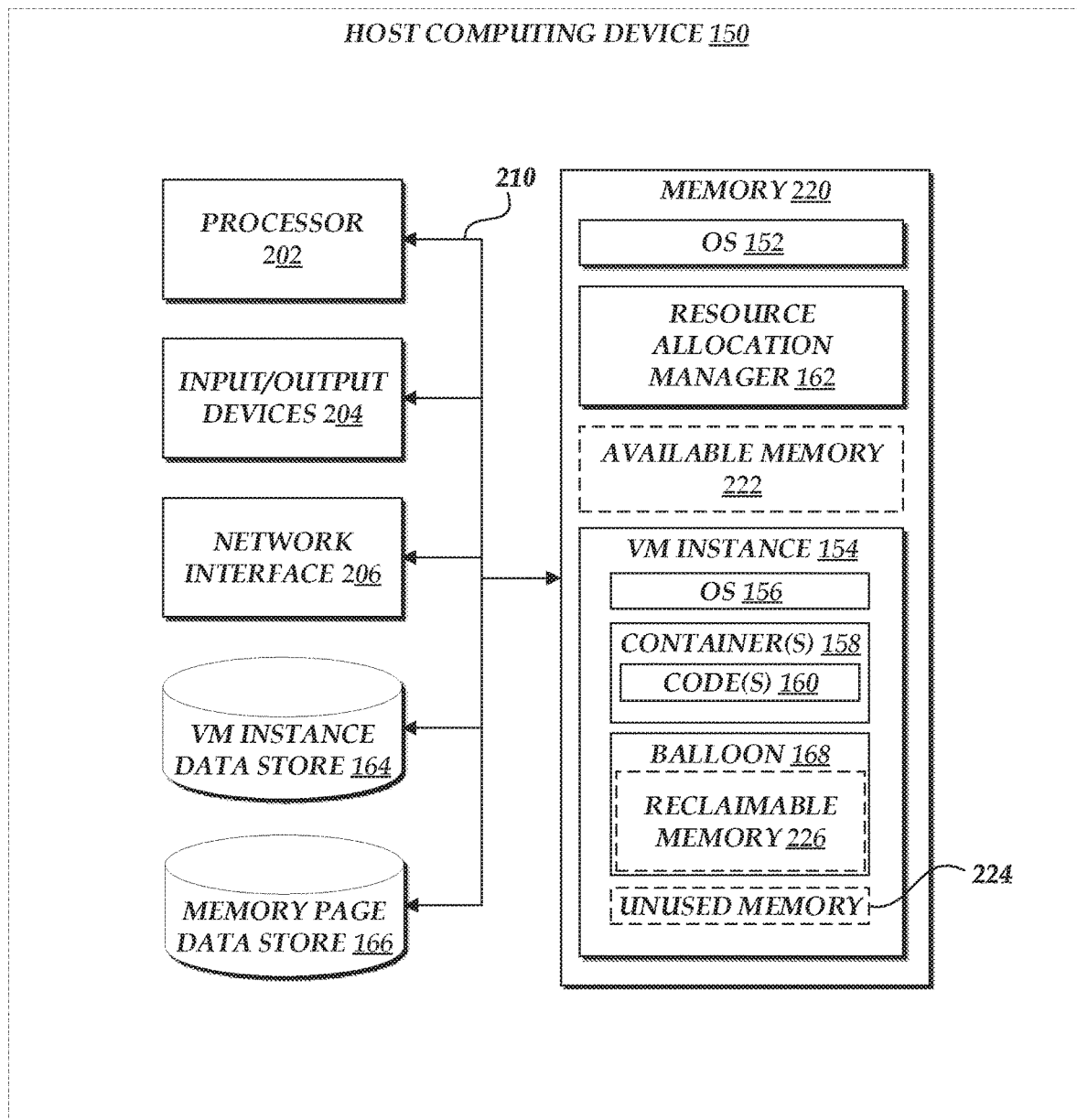

FIG. 2B depicts the general architecture of the host computing device 150 after the balloon process 168 has "inflated" by requesting that the operating system 156 (or, in some embodiments, another process) allocate at least a portion of the unused memory 224 to the balloon process 168. Unless described otherwise, components illustrated in FIG. 2B are identical to those illustrated in FIG. 2A. In various embodiments, as described in more detail below, the balloon process 168 may continue to inflate until it has obtained all of the unused memory 224, or may identify and designate a portion of the unused memory 224 as a buffer to allow for potential memory requests generated during execution of user-submitted code(s) 160. In other embodiments, the balloon process 168 may interact with the operating system 156, resource allocation manager 162, or other processes to obtain resource utilization profiles for the currently executing code 160, and may determine an amount of unused memory 224 that the code(s) 160 will require during further execution. In further embodiments, the resource allocation manager 162, operating system 156, a combination thereof, or another process may schedule execution of the balloon process 168 based on a resource utilization profile. For example, the resource utilization profile may include a utilization "spike" (e.g., a time period during which a large amount of a computing resource is utilized) during a first phase of executing the code 160, followed by a second phase win which less of the computing resource is utilized. The resource allocation manager 162 may therefore initially allocate a large quantity of the computing resource to the virtual machine instance 154, and then schedule the balloon process 168 to execute after the first phase of executing the user-submitted code 160. In other embodiments, as described in more detail below, the resource allocation manager 162 may schedule execution of the balloon process 168 based on the availability of other computing resources, such as processor time or communications bandwidth, such that execution of the balloon process 168 does not interfere with the execution of user-submitted code 160.

Figure 2C:
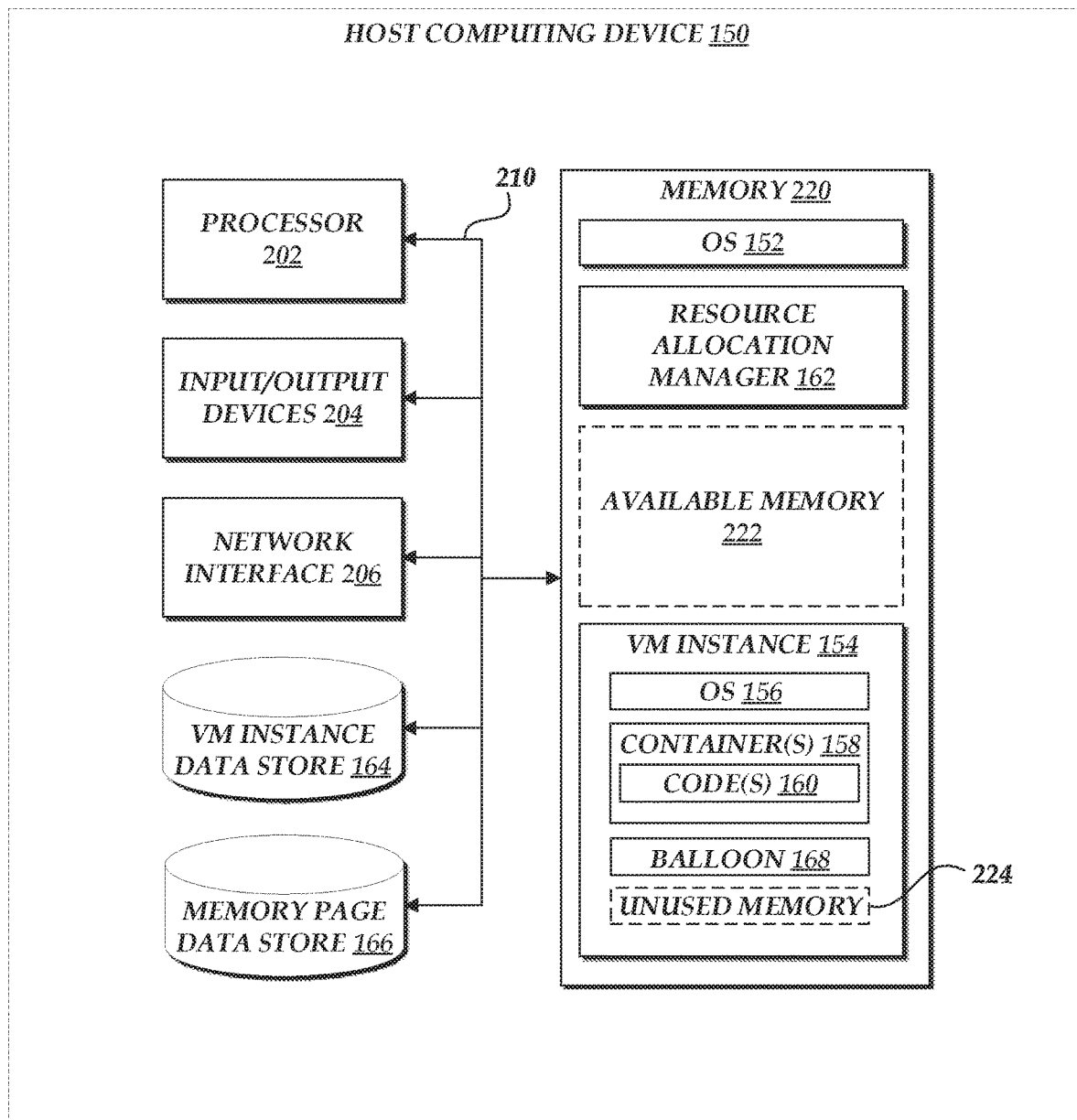

FIG. 2C depicts the general architecture of the host computing device 150 after the resource allocation manager 162 has reclaimed at least a portion of the unused memory 224 that was identified as reclaimable by the balloon process 168, and has added this reclaimed memory to the pool of available memory 222. Unless described otherwise, components illustrated in FIG. 2C are identical to those illustrated in FIG. 2A. As described in more detail below, the balloon process 168 may communicate with the resource allocation manager 162 regarding the memory that it has identified as reclaimable, and may "deflate" by releasing that memory in conjunction with the resource allocation manager 162 changing its allocation of memory to the virtual machine instance 154. For example, the resource allocation manager 162 may reduce the allocation of memory 220 to the virtual machine instance 154 by the amount of memory held by the balloon process 168, and may instruct the balloon process 168 to release the memory it is holding as the allocation of memory 220 to the virtual machine instance 154 is reduced.

In various embodiments, the resource allocation manager 162 may reclaim all or part of the unused memory 224 that the balloon process 168 identifies as reclaimable. For example, the resource allocation manager 162 may determine that the amount of memory 220 allocated to the virtual machine instance 154 should not fall below a threshold, even if the balloon process 168 indicates that the virtual machine instance 154 is not currently using the threshold amount of memory. As a further example, the resource allocation manager 162 may determine that specific memory pages can be reallocated based on performance considerations, such as a consideration of whether it would be more efficient to reclaim the memory page now and restore it at a later time, or whether the resource costs associated with writing the page to a storage device and reading it from the storage device outweigh the benefits of reclaiming the page. As a still further example, the resource allocation manager 162 may obtain a forecast of user-submitted tasks that it expects to execute in the near future, and may determine an amount of memory to reclaim based on sizing the virtual machine instance 154 for the pending tasks.

Figure 2D:
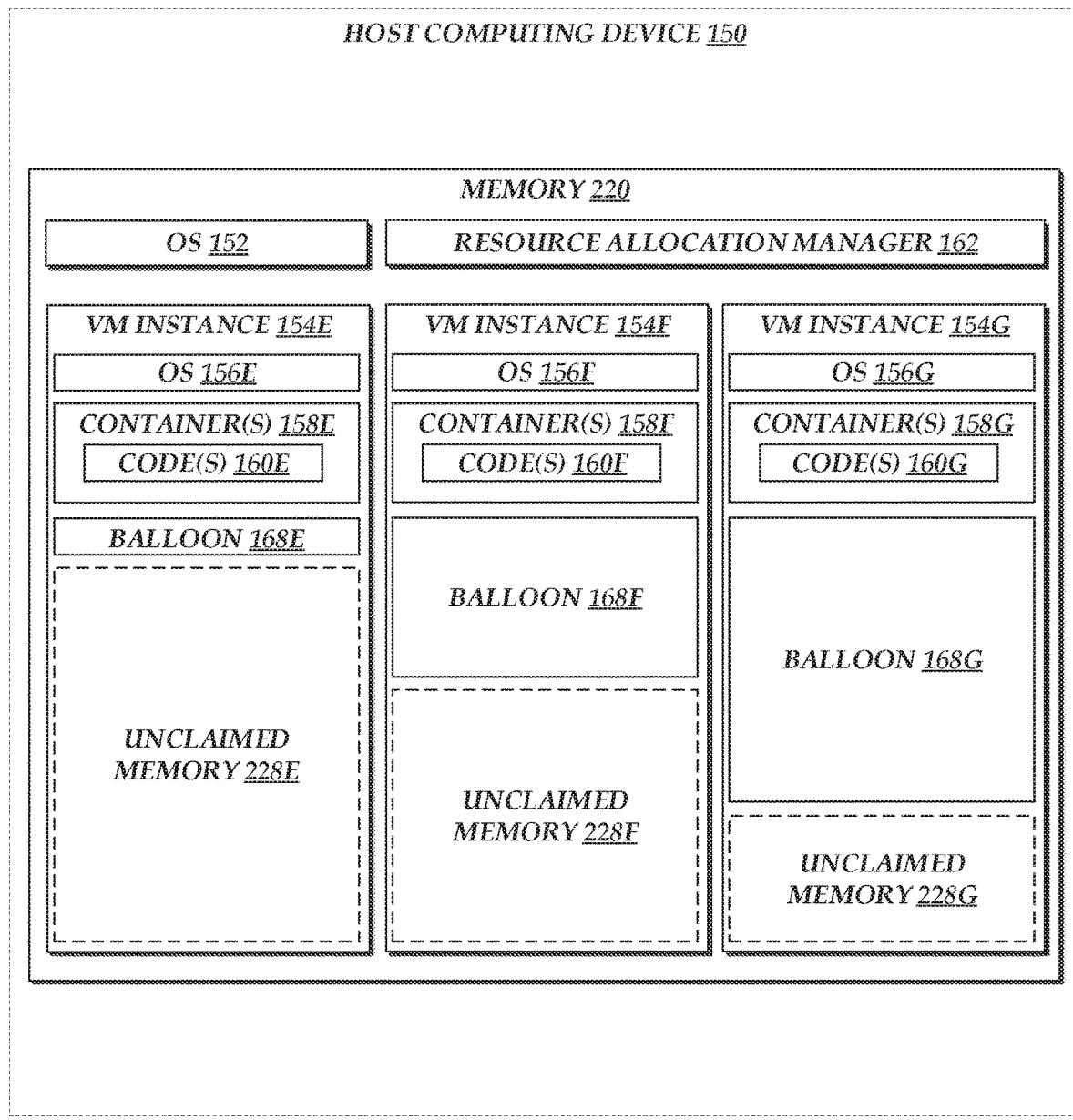

FIG. 2D depicts an embodiment of the host computing device 150 in which portions of the memory 220 and other computing resources have been allocated to a number of virtual machine instances 154E-G, and in which balloon processes 168E-G are used to dynamically configure and reconfigure the amount of unclaimed memory 230E-G in each virtual machine instance 154E-G. For clarity of illustration, components of the host computing device 150 other than the memory 220 have been omitted. In the illustrated embodiment, the virtual machine instances 154E-G each have the same amount of allocated memory 228E-G, but are presented to users as having differing amounts of unclaimed memory 230E-G by controlling the amount of memory allocated to the balloon processes 168E-G.

In some embodiments, as described in more detail below, the resource allocation manager 162 may use the balloon processes 168E-G to simplify provisioning of virtual machine instances 154E-G. For example, the resource allocation manager 162 may provision and configure a pool of virtual machine instances 154E-G with identical computing resources prior to receiving requests to execute user-submitted tasks, and then inflate the balloon processes 168E-G to reclaim over-allocated resources once the actual resource needs for a particular task can be determined. In some embodiments, the resource allocation manager 162 may provision and configure the virtual machine instances 154E and their respective operating systems 156E-G as having the specified amount of allocated memory 228E-G, but "behind the scenes" the resource allocation manager 162 may allocate only the unclaimed memory 230E unless and until additional memory is needed. The resource allocation manager 162 may thus use the balloon processes 168E-G to dynamically change the amount of memory 220 assigned to a virtual machine instance 154E-G without reprovisioning the virtual machine instance 154E-G, and may thereby avoid difficulties or challenges related to changing the computing resources of a "live" virtual machine instance 154E-G. Additionally, in some embodiments (not shown in FIG. 2D), the resource allocation manager 164 may provision a virtual machine instance with all of its assigned memory claimed by a balloon process (i.e., with no unclaimed memory), and may subsequently create unclaimed memory by releasing memory held by the balloon process.

In some embodiments, the on-demand code execution system 110 may use a reclaimable resource system to process user requests to change the allocation of computing resources to a virtual machine instance that is currently executing a user-submitted task. For example, the on-demand code execution system 110 may process a request to execute a user-submitted task on a virtual machine instance having a specified amount of memory 220. The resource allocation manager 162 may execute the code 160G associated with the task by assigning it to a virtual machine instance 154G that has an allocated memory 228G in excess of the specified amount, and then inflating the balloon process 168G until only the specified amount of user-accessible memory 230G remains. The on-demand code execution system 110 may then receive a subsequent user request to increase the amount of memory 220 allocated to the virtual machine instance 154G, and may process the subsequent request by deflating the balloon process 168G to increase the amount of user-accessible memory 230G. Similarly, the on-demand code execution system 110 may process a request to reduce the amount of memory 220 allocated to a "live" virtual machine instance 154E by inflating the balloon process 168E.

In some embodiments, the host computing device 150 may further include components other than those illustrated in FIGS. 2A, 2B, 2C, and 2D. For example, the host computing device 150 may include components for collecting and storing resource utilization metrics, which may be used to determine which resources are reclaimable. As a further example, the memory 220 may include data regarding virtual machine instances or pending tasks to be executed. As a still further example, the host computing device 150 may include a resource utilization profile data store, which may contain information regarding the resources utilized by tasks executed on any or all of the virtual machine instances 154A-G. FIGS. 2A, 2B, 2C, and 2D are thus understood to be illustrative but not limiting.

Figure 3A:
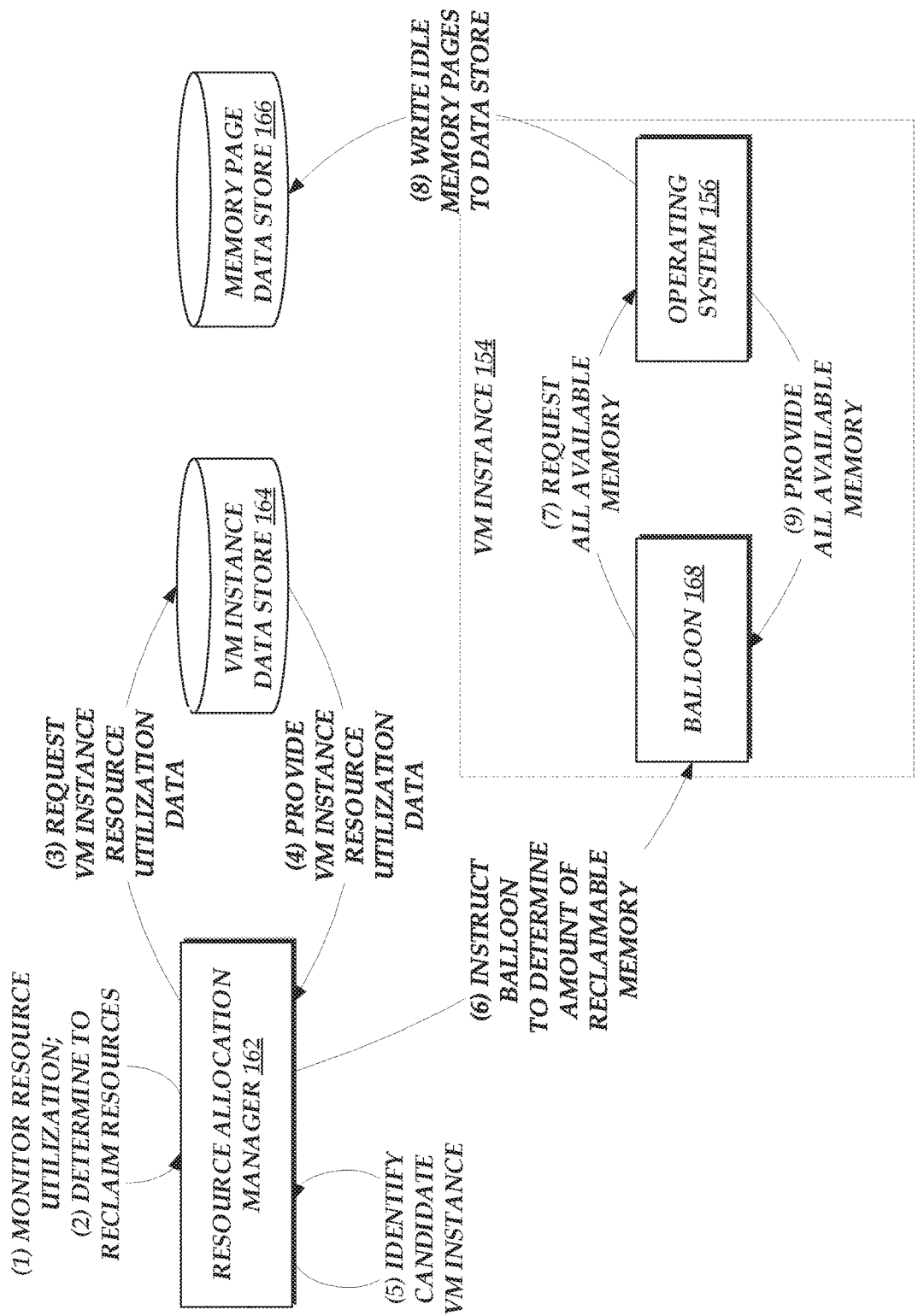
FIGS. 3A and 3B are flow diagrams depicting illustrative interactions for reclaiming computing resources from virtual machine instances in accordance with aspects of the present disclosure.
Figure 3B:
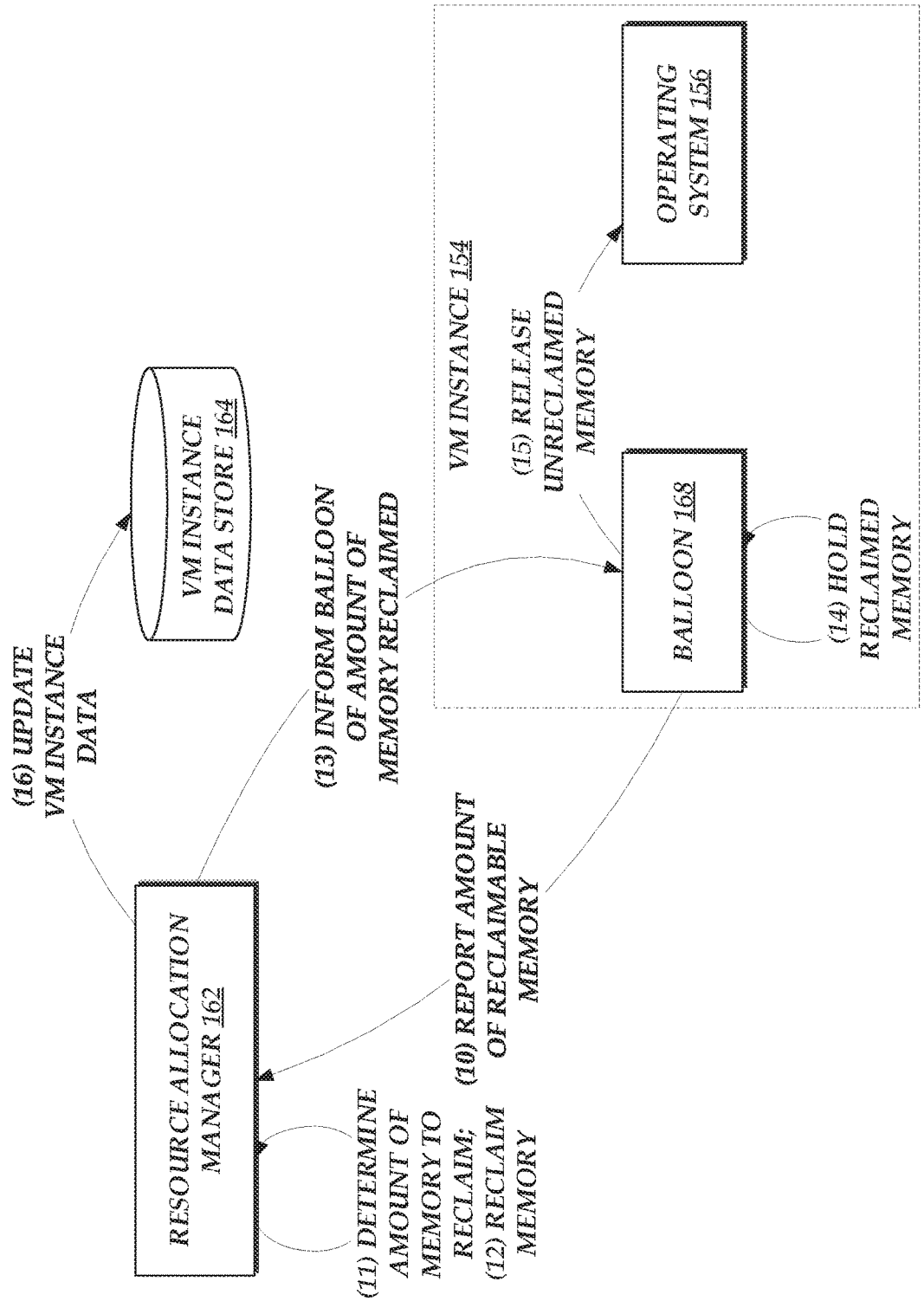

FIGS. 3A and 3B depict illustrative interactions for reclaiming computing resources in accordance with aspects of the present disclosure. As discussed above, the illustrative interactions may allow an on-demand code-execution system to make more efficient use of computing resources that would otherwise be idle or underutilized by determining that these resources can be reclaimed, reclaiming them, and allocating them to other uses (e.g., provisioning additional virtual machine instances). With reference now to FIG. 3A, at (1), a resource allocation manager 162 monitors computing resource utilization on a device such as the host computing device 150 depicted in FIGS. 2A, 2B, 2C, and 2D. Illustratively, the resource allocation manager 162 may monitor utilization of computing resources in terms of their availability to be allocated or reallocated to virtual machine instances, and may evaluate resource utilization relative to current or predicted demand for computing resources. In some embodiments, the resource allocation manager 162 may monitor utilization of computing resources to determine whether sufficient resources are available to execute a resource reclamation activity. For example, a resource reclamation activity may consume a known or predicted quantity of processing time, communications bandwidth, or other computing resources, and the resource allocation manager 162 may monitor the availability of these resources. In other embodiments, the resource allocation manager 162 may monitor computing resources indirectly. For example, the resource allocation manager 162 may monitor reads and writes to a data store, such as the memory page data store 166 depicted in FIGS. 2A, 2B, 2C, and 2D, to detect and quantify utilization of memory allocated to virtual machine instances. Additionally, in some embodiments, the resource allocation manager 162 may obtain resource utilization profiles, historical measurements of previous task executions, or other predictions of resource utilization associated with tasks executing on the host computing device 150, and may predict resource utilization based on these data.

At (2) the resource allocation manager 162 makes a determination that computing resources should be reclaimed. In various embodiments, the determination may be based on factors such as demand for computing resources, availability of computing resources to be allocated, utilization of allocated computing resources, availability of computing resources for performing a resource reclamation activity, time elapsed since a reclamation activity was last performed, and other criteria. For example, the resource allocation manager 162 may determine that the host computing device 150 does not have sufficient resources to provision an additional virtual machine instance, or that a quantity or percentage of a computing resource that is available to be allocated to virtual machine instances has fallen below a threshold. As a further example, the resource allocation manager 162 may determine that a processor on the host computing device 150 is currently idle and could be used to perform a resource reclamation activity. As a still further example, the resource allocation manager 162 may determine that memory allocated to virtual machine instances is currently underutilized based on the volume of reads and writes to a backing data store.

At (3), the resource allocation manager requests virtual machine instance resource utilization data from the virtual machine instance data store 164. In various embodiments, the virtual machine instance resource utilization data may include information regarding the number and type of virtual machine instances on the host computing device 150, the computing resources allocated to the virtual machine instances, per-instance resource utilization metrics, instantiation times, number of tasks executed, amount or percentage of idle time, resource profiles for tasks executing on the virtual machine instances, start times for tasks, estimated or actual task execution durations (e.g., based on task profiles or output received from the task), the amount of time since the virtual machine instance was instantiated, the amount of time since a task was executed on the virtual machine instance, the amount of time since a resource reclamation activity was performed on the virtual machine instance, or other data or metrics. At (4), the virtual machine instance data store 164 provides the requested resource utilization data.

At (5), the resource allocation manager 162 identifies a virtual machine instance 154 from which a computing resource may be reclaimed. Illustratively, the virtual machine instance 154 may be identified based on the virtual machine instance resource utilization data. For example, the resource allocation manager 162 may determine a weighted score for each virtual machine instance on the host computing device 150 based on factors such as the estimated amount of idle time for each instance, and may identify the virtual machine instance 154 based on the weighted score. In other embodiments, the resource allocation manager 162 may select the virtual machine instance 154 randomly, iterate through the virtual machine instances in a particular sequence (e.g., from oldest to newest, largest to smallest, etc.), or apply other criteria.

At (6), the resource allocation manager 162 instructs a resource reclamation identification process to identify an amount of a computing resource that is reclaimable. In the illustrated embodiment, the resource reclamation identification process is a balloon process 168 and the computing resource is memory. In some embodiments, the resource allocation manager 162 may instruct the virtual machine instance 154 to execute the balloon process 168 when the virtual machine instance 154 at the next time it is not otherwise occupied (e.g., when it has completed execution of a user-submitted task). In other embodiments, the resource allocation manager 162 may instruct the virtual machine instance to execute the balloon process 168 in parallel with a user-submitted task. In some embodiments, the resource allocation manager 162 may communicate with the balloon process 168 via an application programming interface ("API") call or other protocol that allows the resource allocation manager 162 to invoke the balloon process 168. In other embodiments, the balloon process 168 (or instructions to invoke the balloon process 168) may be sent to the virtual machine instance 154 via the protocol used to assign user-submitted tasks to the virtual machine instance 154 (e.g., via a worker manager 140).

In some embodiments, the resource allocation manager 162 may determine schedules, triggers, or other criteria for invoking execution of the balloon process 168, and may transmit these criteria to the virtual machine instance 154 rather than directly invoking the balloon process 168. For example, the resource allocation manager 162 may instruct the virtual machine instance to execute the balloon process 168 upon completion of any user-submitted task, after a specified number of tasks have been executed, after a task meeting certain criteria has been completed, while a task meeting certain criteria is in progress, and so forth.

At (7), the balloon process 168 may "inflate" by requesting that the operating system 156 of the virtual machine instance 164 allocate memory to the balloon process 168. In some embodiments the interactions at (7), (8), and (9) may be carried out repeatedly, and the balloon process 168 may iteratively request memory pages from the operating system 156 until a criterion is satisfied. For example, the balloon process may determine a threshold amount of memory to identify as reclaimable, and request memory pages until the threshold is satisfied. In other embodiments, the balloon process 168 may request memory pages until the operating system 156 runs out of memory to allocate.

At (8), in some embodiments, the operating system 156 may write disk-backed memory pages to the memory page data store 166 in order to free up memory pages to be allocated to the balloon process 168. In some embodiments, the balloon process 168 or the operating system 156 may determine whether disk-backed memory pages should be written to the memory page data store 166 or whether doing so would be inefficient. For example, the balloon process 168 may determine that a memory page will not be accessed for a threshold period of time, and that reclaiming the memory page is therefore preferable. As a further example, the balloon process 168 or the operating system 156 may determine that the memory page will be accessed within the threshold period of time, and that keeping the page in memory rather than reloading it from disk would be more efficient. In various embodiments, the balloon process 168 or the operating system 156 may apply different criteria (e.g., time between reads or writes to the memory page, time required to re-load the memory page, etc.) to determine whether a memory page should be offloaded to the memory page data store 166. At (9), the operating system 156 provides the memory page(s) to the balloon process 168.

With reference now to FIG. 3B, at (10), the balloon process 168 reports the amount of memory it was able to obtain to the resource allocation manager 162. In some embodiments, as described above, the balloon process 168 may release a quantity of memory pages as a buffer against the virtual machine instance 154 running out of memory, and may thus report less than the total amount of memory it was able to obtain. In other embodiments, the balloon process 168 may report the total amount of memory it was able to obtain, and the resource allocation manager 162 may determine whether and in what amount to allocate a buffer.

At (11), the resource allocation manager 162 determines the amount of memory to reclaim from the virtual machine instance 154. In some embodiments, the resource allocation manager 162 may reclaim all of the memory that was identified as reclaimable by the balloon process 168. In other embodiments, the resource allocation manager 162 may reclaim a portion of the amount of memory identified as reclaimable. For example, as described above, the resource allocation manager 162 may leave a fixed amount or percentage of memory as a buffer against the virtual machine instance 154 running out of memory during execution of a task. As further examples, the resource allocation manager 162 may determine the amount of memory to reclaim based on resource utilization profiles for currently executing tasks, resource utilization profiles for tasks the virtual machine instance 154 is predicted to execute, historical resource utilization metrics, metrics collected during execution of the balloon process 168 (e.g., a number of memory pages written to the memory page data store 166, performance or utilization metrics for a currently executing task, etc.), or other criteria. At (12), the resource allocation manager 162 reclaims the determined amount of memory and returns it to the pool of available computing resources.

At (13), in some embodiments, the resource allocation manager 162 informs the balloon process 168 of the amount of memory that was reclaimed. Illustratively, the balloon process 168 may effectively "hide" the reclamation of memory that was assigned to the virtual machine instance 154, and may thereby reduce or eliminate any need to reprovision or reconfigure the virtual machine instance 154 when the amount of memory allocated to it is reduced. For example, the virtual machine instance 154 and/or the operating system 156 may continue to operate as though the reclaimed quantity of memory was still allocated to the virtual machine instance 154 and was merely assigned to the balloon process 168. The balloon process 168 may therefore, at (14), continue to hold the reclaimed memory for as long as is needed to maintain the facade. In further embodiments, at (15), the balloon process 168 may release any memory that was identified as reclaimable and not reclaimed, and thereby return this quantity of memory to the operating system 156 for assignment to other processes (e.g., execution of user-submitted code 160). In other embodiments, the resource allocation manager 162 may inform the operating system 156 of the amount of memory reclaimed, and the balloon process 168 may release all of the memory it identified as reclaimable so that the operating system 156 can turn over the reclaimed amount of memory to the resource allocation manager 162.

At (16), the resource allocation manager 162 transmits updated virtual machine instance data to the virtual machine instance data store 164. The updated virtual machine instance data may include, for example, updated information regarding the amount of memory assigned to the virtual machine instance 154, the time at which a reclamation process was most recently executed on the virtual machine instance 154, resource utilization metrics, and the like. In some embodiments, the resource allocation manager 162 may generate or update computing resource utilization profiles for tasks executed on the virtual machine instance 154, and may transmit these profiles to the virtual machine instance data store 164 or another data store.

It will be understood that FIGS. 3A and 3B are provided for purposes of example, and that many variations on the depicted interactions are within the scope of the present disclosure. For example, the interaction at (16) in FIG. 3B may be carried out prior to or in parallel with the interactions at (13), (14), or (15). As a further example, as described above, the interaction at (11) may be carried out by the balloon process 168. FIGS. 3A and 3B are thus understood to be illustrative and not limiting.

Figure 4:
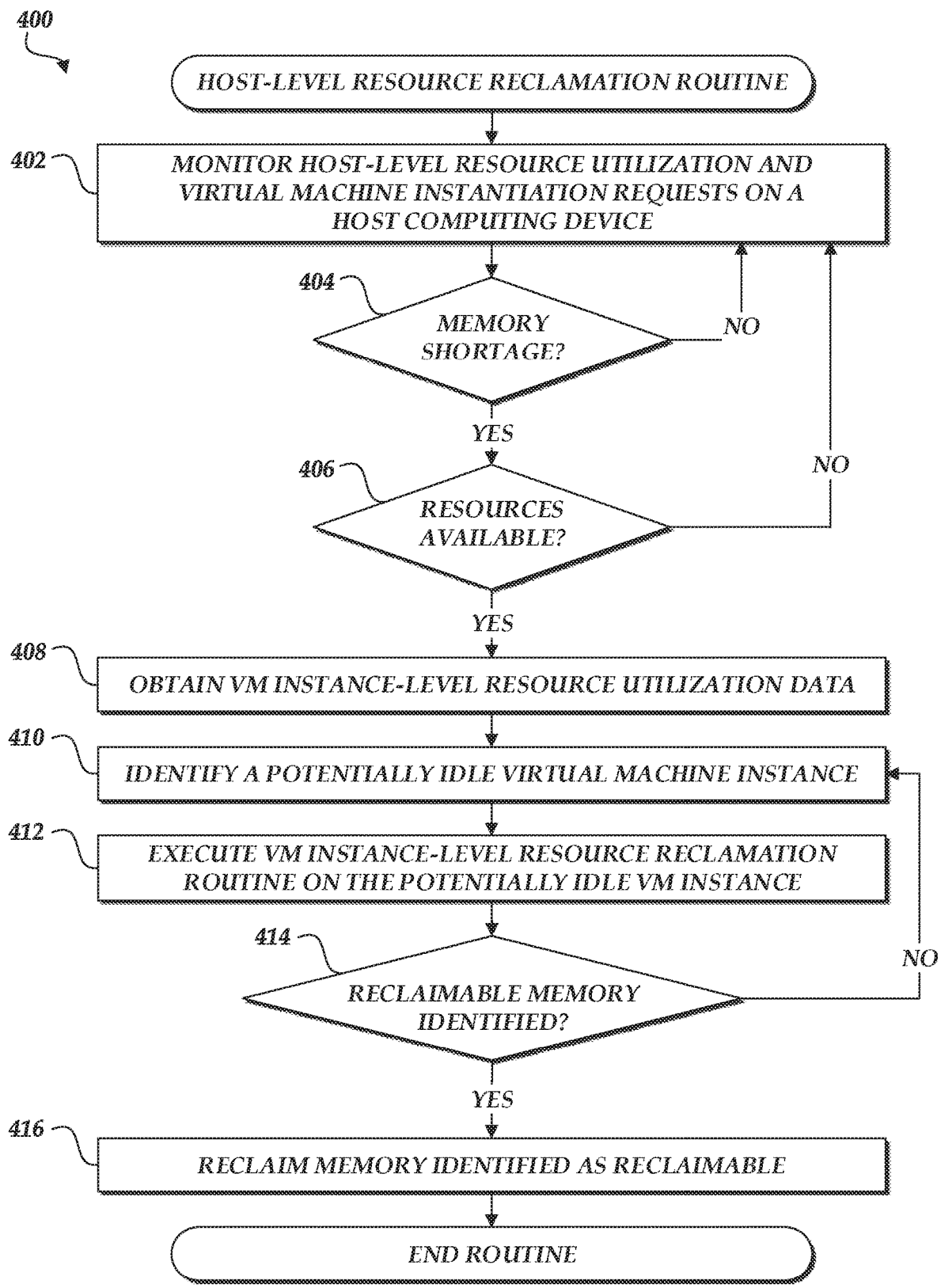
FIG. 4 is a flow chart depicting an illustrative routine for reclaiming computing resources from virtual machine instances in accordance with aspects of the present disclosure.

FIG. 4 is a flow diagram of an illustrative routine 400 for reclaiming computing resources at the level of a host computing device. The routine 400 may be carried out, for example, by the resource allocation manager 162 depicted in FIG. 2A. The routine 400 begins at block 402, where utilization of computing resources and demand for computing resources on a host computing device may be monitored. Illustratively, utilization and demand may be monitored in terms of quantities or percentages of resources consumed by, or allocated to, virtual machine instances on the host computing device. For example, utilization of a processor may be monitored to identify virtual machine instances whose consumption of processor time is below a threshold. In some embodiments, resource utilization profiles for user-submitted tasks may be used to predict demand for computing resources.

At decision block 404, a determination may be made as to whether a computing resource (e.g., memory) needs to be reclaimed. For example, the determination may be that the quantity of memory available to be allocated to new or existing virtual machine instances has fallen below a threshold, is insufficient to meet projected demand, or otherwise does not satisfy a criterion. In some embodiments, block 402 and decision block 404 may be omitted and the routine 400 may be carried out in accordance with a schedule (e.g., nightly or hourly). If the determination at decision block 404 is that the quantity of available memory satisfied the applied criteria, then the routine 400 branches to block 402 and continues monitoring the utilization of computing resources.

If the determination at decision block 404 is that a computing resource needs to be reclaimed, then at decision block 406 a determination may be made as to whether sufficient computing resources are available to carry out a reclamation activity (e.g., the remaining blocks of the routine 400). For example, further execution of the routine 400 may require processor time, memory, bandwidth, and the like, and a determination may be made as to whether sufficient quantities of these resources will be available or whether utilizing these resources would interfere with execution of user-submitted tasks. If the determination at decision block 404 is that insufficient quantities of resources are (or will be) available to carry out a reclamation activity, then the routine 400 returns to block 402 and continues monitoring computing resources. In some embodiments, decision block 406 may be carried out iteratively until sufficient resources are available.

If the determination at decision block 406 is that sufficient computing resources are available to carry out a reclamation activity, then the routine 400 branches to block 408, where resource utilization data for individual virtual machine instances may be obtained. Illustratively, resource utilization data may include amounts of processor time consumed, volumes of reads and writes to storage media, amounts of disk-backed memory read or written, and the like. In some embodiments, resource utilization profiles may be obtained for tasks executing on individual virtual machine instances, and may be used to estimate current or future resource utilization.

At block 410, a virtual machine instance is identified as a potential holder of computing resources that could be reclaimed. Illustratively, the virtual machine instance may be identified based on criteria such as consumption of computing resources, utilization of computing resources relative to the quantity of computing resources allocated to the virtual machine instances, and so forth. In some embodiments, block 408 may be omitted and a virtual machine instance may be identified at block 410 based on criteria other than resource utilization data. For example, the virtual machine instance may be selected randomly, selected on a round-robin or periodic basis, identified based on the amount of time since a reclamation process was last executed on the virtual machine instance, and so forth.

At block 412, a resource reclamation routine (e.g., the routine 500 described in more detail with reference to FIG. 5 below) may be carried out on the identified virtual machine instance. Illustratively, the resource reclamation routine may identify all or part of a resource assigned to the virtual machine instance as reclaimable, based on factors such as the resource reclamation routine's ability to request and receive the resource, utilization of the resource, whether the virtual machine instance has completed execution of a user-submitted task, and the like. The resource reclamation routine may thus provide information regarding resource utilization by the virtual machine instance that would otherwise not be externally available, and may do so in a manner that does not interfere with task execution on the virtual machine instance.

At decision block 414, a determination may be made as to whether the resource reclamation routine identified a reclaimable quantity of the computing resource. As described in more detail below, the resource reclamation routine may report an amount of memory or other computing resource that it was able to obtain without disrupting other tasks executing on the virtual machine instance. In some embodiments, a determination may be made as to whether or how much of the reclaimable quantity of the computing resource should be reclaimed. For example, as described above, the determination may be that a portion of the reclaimable quantity should be retained by the virtual machine instance as a buffer.

In some embodiments, the routine 400 may determine a quantity of memory that needs to be reclaimed in order to meet current or pending resource demands, and the determination at decision block 414 may be as to whether the quantity of memory that can be reclaimed from this virtual machine instance is sufficient to meet the demand. If not, then the routine 400 may branch to block 410, identify another virtual machine instance, and iterate until a sufficient quantity of the computing resource is identified as reclaimable.

If a reclaimable quantity of the computing resource is identified (or, in some embodiments, if and when a sufficient reclaimable quantity of the computing resource is identified), then the routine 400 branches to block 416, where the identified quantity of the computing resource is reclaimed. In some embodiments, as described in more detail above, the computing resource may be reclaimed by indicating to the resource reclamation process that it should retain all or part of the memory it has identified as reclaimable, and then deallocating that quantity of the computing resource from the virtual machine instance. In other embodiments, the routine 400 may reprovision the virtual machine instance to change the amount of the computing resource that is allocated to it.

It will be understood that FIG. 4 is provided for purposes of example, and that many variations on the depicted interactions are within the scope of the present disclosure. For example, decision blocks 404 and 406 may be carried out in either order or in parallel. As a further example, block 408 may be carried out at any time prior to block 410. As a still further example, as described above, decision block 404 may be omitted and the routine 400 may be carried out periodically or in response to various criteria being satisfied. FIG. 5 is thus understood to be illustrative and not limiting.

Figure 5:
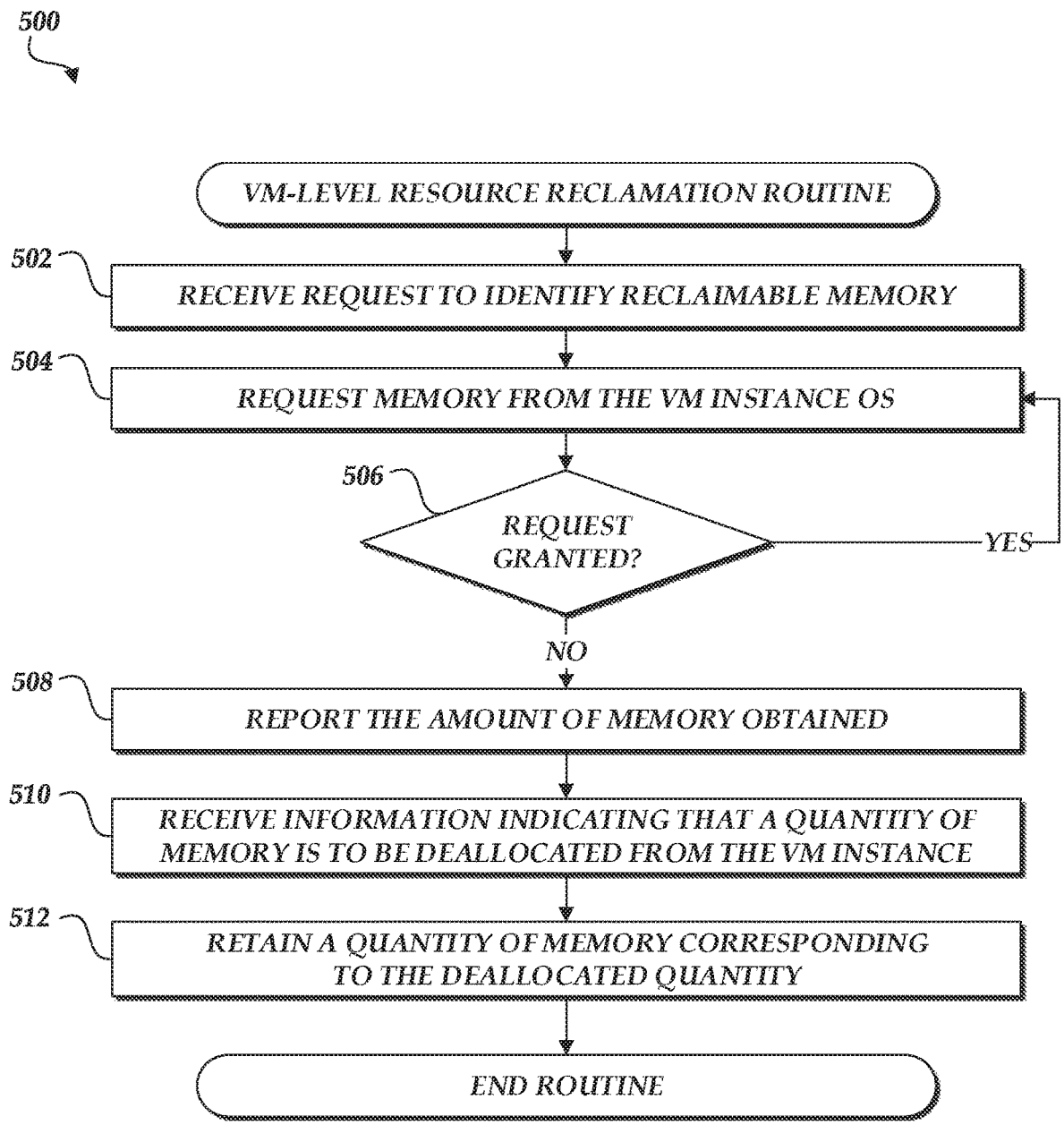
FIG. 5 is a flow chart depicting an illustrative routine for determining the amount of resources that can be reclaimed from a virtual machine instance in accordance with aspects of the present disclosure.

FIG. 5 is a flow diagram of an illustrative resource reclamation routine 500 that implements aspects of the present disclosure. The routine 500 may be carried out within a virtual machine instance executing on a host computing device, for example, by the balloon process 168 depicted in FIG. 2A. The routine 500 begins at block 502 where a request to identify reclaimable memory may be obtained. Illustratively, the request may be obtained from a host-level routine such as the routine 400 depicted in FIG. 4. In some embodiments, block 502 may be omitted and the routine 500 may be carried out in response to an event other than a request. For example, the routine 500 may be carried out in response to detecting that the virtual machine instance has completed execution of a user-submitted task.

At block 504, a block of virtual memory may be requested from the operating system of the virtual machine instance. In various embodiments, the block of virtual memory may be of a fixed size (e.g., corresponding to a number of memory pages) or may vary in size based on factors such as the amount of memory allocated to the virtual machine instance, the success or failure of a previous attempt to request memory, or other criteria. In some embodiments, the amount of memory initially requested may be based on a resource utilization profile associated with a task executing on the virtual machine instance.

At decision block 506, a determination may be made as to whether the request for memory was granted. If so, then the routine 500 returns to block 504 and repeats the request. If not, then the routine 500 branches to block 508. In some embodiments, the routine 500 may increase or decrease the size of the next request based on whether the previous request was granted, and may only proceed to block 508 after a request for a threshold quantity of memory is denied. For example, the routine 500 may initially request a specified number of memory pages, increase the size of subsequent requests geometrically or exponentially until a request is denied, and then decrease the size of requests until a request for the specified number of memory pages is denied.

At block 508, the quantity of memory that was obtained may be reported to the sender of the request (or, in some embodiments, to a hypervisor or other process executing on the host computing device) as potentially reclaimable. In some embodiments, as described above, a percentage or portion of the memory obtained by the routine 500 may be set aside as a buffer to prevent the virtual machine instance from running out of memory. In other embodiments, the total quantity of memory that was obtained may be identified as reclaimable.

At block 510, in some embodiments, information may be received indicating that a quantity of memory has been or is being deallocated from the virtual machine instance. For example, the routine 500 may report that it obtained ten memory pages, and may receive an indication that eight of the memory pages are being deallocated. At block 512, the memory pages that are being deallocated may be retained by the routine 500 to prevent the virtual machine instance from further trying to access or assign them. The routine 500 may thus obviate the need to reprovision or reconfigure the virtual machine instance to have a different quantity of allocated memory, since the memory that was deallocated appears within the virtual machine instance to still be assigned to the routine 500. In some embodiments, however, the virtual machine instance may be reprovisioned with a new memory size and the operating system or another component of the virtual machine instance may coordinate with the routine 500 to release the deallocated memory.

It will be understood that FIG. 5 is provided for purposes of example, and that many variations on the depicted interactions are within the scope of the present disclosure. For example, the routine 500 may release part of all of the memory that was requested at block 504 (e.g., if the routine 500 identified ten memory pages as reclaimable and the system then reclaimed eight memory pages, the routine 500 may release the remaining two). As a further example, block 502 may be omitted and the routine 500 may proactively report that a quantity of memory is reclaimable. FIG. 5 is thus understood to be illustrative and not limiting.

Figure 6:
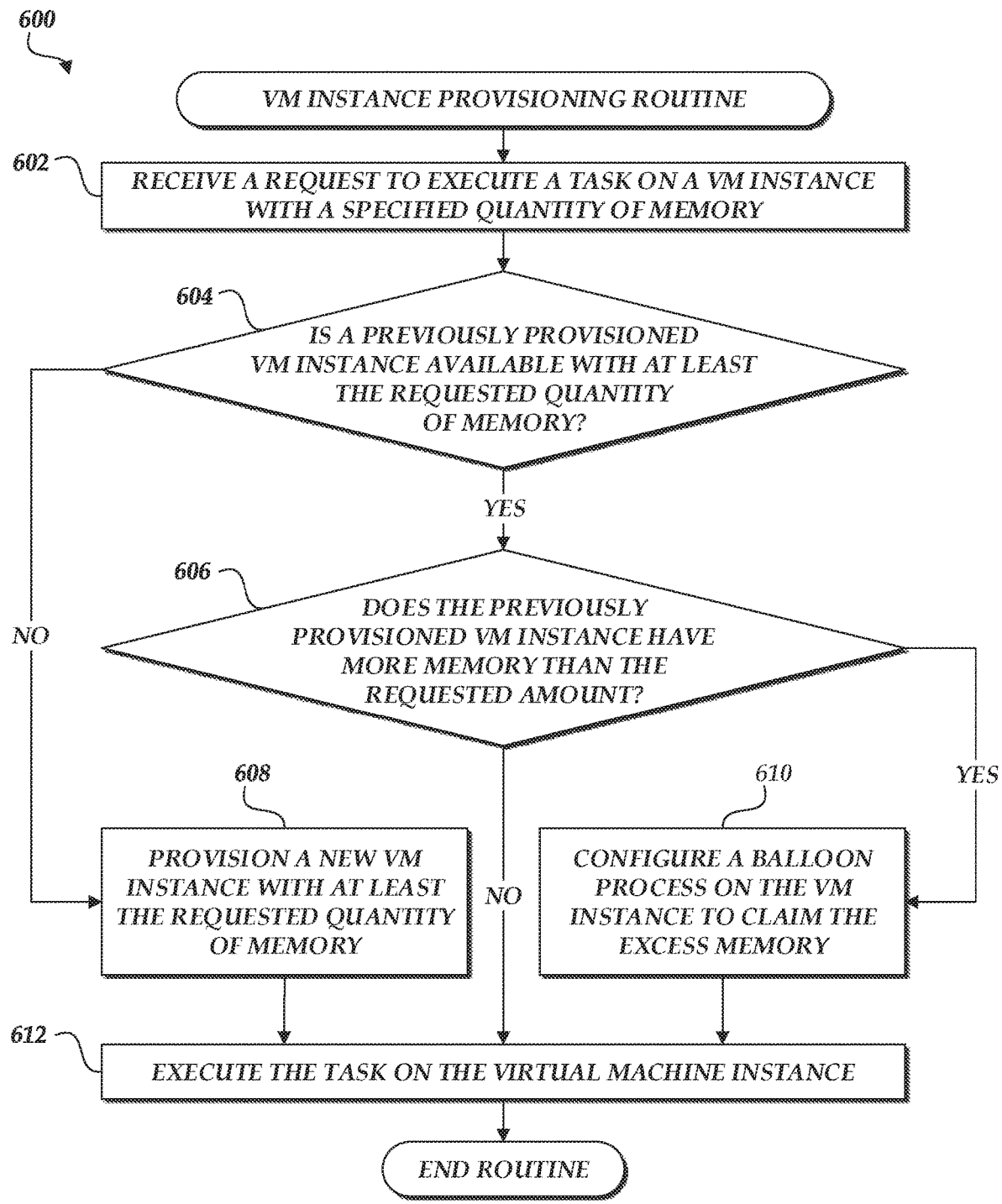
FIG. 6 is a flow chart depicting an illustrative routine for provisioning virtual machine instances that make varying amounts of computing resources available in accordance with aspects of the present disclosure.

FIG. 6 is a flow diagram of a virtual machine instance provisioning routine 600 that implements aspects of the present disclosure. The virtual machine instance provisioning routine 600 may be carried out, for example, by the resource allocation manager 162 depicted in FIGS. 2A, 2B, and 2C. The routine 600 begins at block 602, where a request may be received to execute a task on a virtual machine instance having a specified quantity of a computing resource. Illustratively, an on-demand code execution system may allow a user to select (e.g., via the frontend 120 depicted in FIG. 1) a configuration for the virtual machine instance that will execute a particular task. A user may therefore request a virtual machine instance having sufficient computing resources to execute the requested task, but avoid wasting resources or incurring unnecessary costs by requesting more resources than are needed. The request may, for example, specify that execution of the requested task is to occur on a virtual machine instance having 768 megabytes ("MB") of memory.

At decision block 604, a determination is made as to whether an existing virtual machine instance having at least the requested quantity of the computing resource is available to execute the task. Illustratively, the routine 600 may be carried out on a host computing device (e.g., the host computing device 150) that is hosting a number of virtual machine instances, each of which may have a quantity of computing resources allocated to it and may be available depending on whether it is current executing another task. If the determination at decision block 604 is that no existing virtual machine instance with the requested quantity of the computing resource is available, then at block 608, in some embodiments, a new virtual machine instance may be provisioned with at least the requested quantity of the computing resource. In other embodiments, the routine 600 may determine whether sufficient computing resources are available to provision a new virtual machine instance and/or may report that the host computing device is unable to fulfill the request to execute the task.

If the determination at decision block 604 is that a virtual machine instance is available with at least the requested quantity of memory, then at decision block 606 that determination is made as to whether the virtual machine instance has more than the requested quantity of memory. For example, the available virtual machine instance may have 1024 MB of memory, and the determination may be that the instance has more than the requested quantity of 768 MB. If so, then at block 610 a balloon process may be configured on the virtual machine instance to reclaim the excess quantity of memory. To continue the previous example, the balloon process may be configured to reclaim 256 MB of the 1024 MB that are allocated to the virtual machine instance, thereby leaving the instance with 768 MB and effectively resizing its memory allocation to comply with the request. Inflating or deflating the balloon process may therefore improve the speed and efficiency of the on-demand code execution system relative to the time and resources consumed in provisioning a new virtual machine instance with exactly the right quantity of memory.

If the determination at block 606 is that the available virtual machine instance has exactly the requested quantity of memory, or after provisioning a new virtual machine instance at block 608 or configuring the balloon process to leave the virtual machine instance with the requested quantity at block 610, the routine 600 continues at block 612, where the request may be fulfilled by executing the task on the virtual machine instance.

It will be understood that FIG. 6 is provided for purposes of example, and that many variations on the depicted interactions are within the scope of the present disclosure. For example, virtual machine instances on the host computing device may always be provisioned with the maximum quantity of memory that a user can request, and blocks 604, 606, and 610 may be consolidated into a determination of whether a virtual machine instance is available and then configuring the balloon process to reclaim or release the appropriate quantity of memory. As a further example, the routine 600 may receive a request for a virtual machine instance having a particular configuration (e.g., a particular quantity of a computing resource) rather than receiving a request to execute a task, and may thus provide the requested virtual machine instance at block 612 rather than executing the task. FIG. 6 is thus understood to be illustrative and not limiting.

Figure 7:
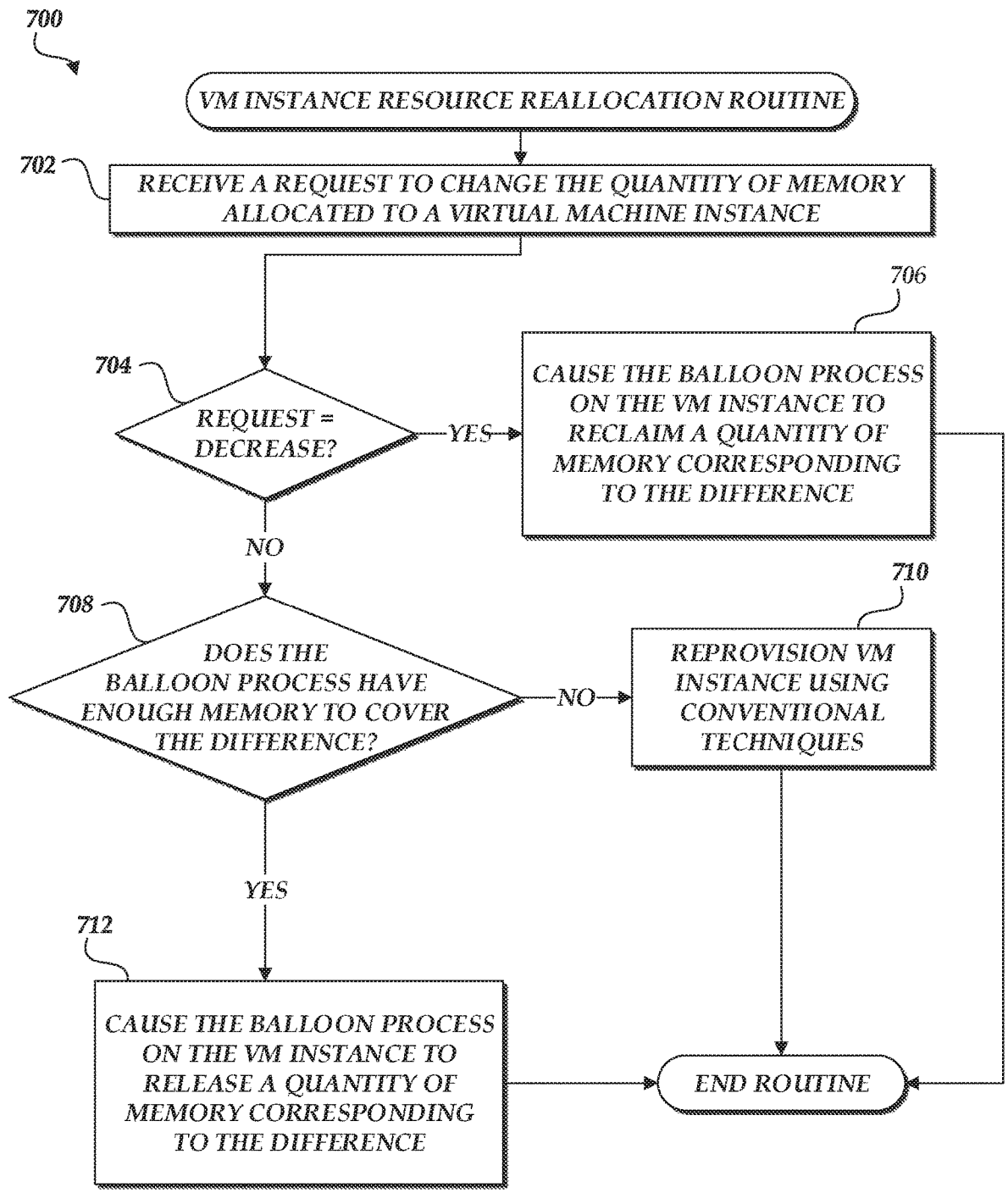
FIG. 7 is a flow chart depicting an illustrative routine for reallocating computing resources assigned to a virtual machine instance in accordance with aspects of the present disclosure.

FIG. 7 is a flow diagram of a virtual machine instance resource reallocation routine 700 that implements aspects of the present disclosure. The virtual machine instance provisioning routine 700 may be carried out, for example, by the resource allocation manager 162 and the balloon process 168 depicted in FIGS. 2A, 2B, and 2C. The routine 700 begins at block 702, where a request may be received to change the quantity of a computing resource that is allocated to a virtual machine instance. For example, a virtual machine instance may have 1536 MB of memory allocated to it, and the request may be to lower its allocation to 1024 MB. In some embodiments, the request may be to increase or decrease the allocation by a specified quantity (e.g., 512 MB) rather than a request to change the allocation to a specified value. Additionally, in some embodiments, a virtual machine instance may have been initially provisioned with a higher quantity of memory (e.g., 2048 MB), and then a computing resource reclamation process may have reclaimed a portion of the original allocation (e.g., a balloon process may have "inflated" to reclaim 512 MB). It may thus be possible to increase or decrease the amount of memory allocated to the virtual machine instance by adjusting the quantity of memory reclaimed by the balloon process.

At decision block 704, a determination may be made as to whether the request is to decrease the quantity of the computing resource. Since the balloon process can be inflated to reclaim all available memory if need be, a request to decrease the quantity of the computing resource can generally be satisfied by (further) inflating the balloon process. If the determination at decision block 704 is that the request is to decrease the quantity, then at block 706 the request may be fulfilled by causing the balloon process to inflate by the necessary amount, after which the routine 700 ends.

If the determination at decision block 704 is instead that the request is to increase the quantity of memory allocated to the virtual machine instance, then at decision block 708 a determination is made as to whether the balloon process has previously reclaimed enough memory to cover the requested increase. To continue the previous example, the virtual machine instance may have been initially provisioned with 2048 MB and the balloon process may have reclaimed 512 MB, leaving the virtual machine instance with 1536 MB. If the request is to change the quantity of memory allocated to the virtual machine instance to, e.g., 1792 MB, then the request can be fulfilled by deflating the balloon process. If the determination at decision block 708 is that the request cannot be fulfilled by deflating the balloon process, then at block 710 the request may be fulfilled using conventional techniques (e.g., by reprovisioning the virtual machine instance with a larger quantity of memory). If the determination at decision block 708 is instead that the request can be fulfilled by deflating the balloon process, then at block 712 the request is fulfilled by causing the balloon process to release the appropriate quantity of memory. In some embodiments, the routine 700 may further allocate additional memory (e.g., from a resource pool on a host computing device) corresponding to the quantity of memory released by the balloon process.

It will be understood that FIG. 7 is provided for purposes of example, and that many variations on the depicted interactions are within the scope of the present disclosure. For example, block 710 may be omitted and the routine 700 may instead report that it was unable to fulfill the request by invoking a memory reclamation process. As a further example, the routine 700 may be triggered by an event (e.g., a user-submitted task completing its execution) rather than receiving a request to change the allocation of memory. FIG. 7 is thus understood to be illustrative and not limiting.

It will be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system for reclaiming computing resources in an on-demand code execution system, the system comprising:

a data store configured to store computer-executable instructions; and a processor in communication with the data store, wherein the computer-executable instructions, when executed by the processor, configure the processor to perform operations including:

obtaining resource utilization metrics regarding demand for computing resources on a host computing device, the demand associated with requests to execute user-submitted tasks on an on-demand code execution system;

determining, based at least in part on the resource utilization metrics, to reclaim one or more memory pages allocated to virtual machine instances executing on the host computing device;

identifying, based at least in part on the resource utilization metrics, a first virtual machine instance instantiated on the host computing device, wherein a first quantity of memory pages is allocated to the first virtual machine instance, and wherein the resource utilization metrics indicate that at least a portion of the first quantity of memory pages is underutilized;

instructing, by a process external to the first virtual machine instance, a reclaimable memory identification process to execute within the first virtual machine instance, wherein the reclaimable memory identification process identifies a reclaimable portion of the first quantity of memory pages allocated to the first virtual machine instance and unclaimed by other processes executing within the first virtual machine instance;

obtaining, from the reclaimable memory identification process executing within the first virtual machine instance, an indication of the reclaimable portion of the first quantity of memory pages allocated to the first virtual machine instance and unclaimed by other processes executing within the first virtual machine instance;

determining, based at least in part on the reclaimable portion of the first quantity of memory pages allocated to the first virtual machine instance and unclaimed by other processes executing within the first virtual machine instance, a quantity of memory pages to reclaim; and reclaiming, from the first virtual machine instance, a quantity of memory pages determined based at least in part on the reclaimable portion of the first quantity of memory pages allocated to the first virtual machine instance and unclaimed by other processes executing within the first virtual machine instance.

2. The system of claim 1, wherein the quantity of memory pages to reclaim comprises the first quantity of memory pages minus the reclaimable portion.

3. The system of claim 1, wherein identifying the first virtual machine instance comprises determining, based at least in part on the resource utilization metrics, that the first virtual machine instance did not utilize one or more computing resources for a threshold duration.

4. The system of claim 3, wherein the one or more computing resources includes the first quantity of memory pages.

5. The system of claim 1, wherein identifying the first virtual machine instance comprises determining, based at least in part on the resource utilization metrics, that the first virtual machine instance utilized one or more computing resources during a specified time period of any of a plurality of virtual machine instances instantiated on the host computing device.

6. A computer-implemented method comprising:

as implemented by one or more computing devices configured with specific computer-executable instructions, determining, based at least in part on resource utilization metrics regarding demand for computing resources on a host computing device, to reclaim a first computing resource allocated to a virtual machine instance executing on the host computing device, wherein the demand for computing resources is associated with requests to execute user-submitted tasks on an on-demand code execution system;

identifying, based at least in part on the resource utilization metrics, a first virtual machine instance from which to reclaim the first computing resource;

instructing, by a process external to the first virtual machine instance, a reclaimable resource identification process to execute within the first virtual machine instance, wherein the reclaimable resource identification process identifies at least a portion of the first computing resource allocated to the first virtual machine instance, and unclaimed by other processes executing within the first virtual machine instance, as a reclaimable quantity of the first computing resource based at least in part on one or more requests to the first virtual machine instance to allocate the first computing resource to the reclaimable resource identification process;

obtaining, from the reclaimable resource identification process executing within the first virtual machine, an indication of the reclaimable quantity of the first computing resource allocated to the first virtual machine instance and unclaimed by other processes executing within the first virtual machine instance; and reclaiming from the first virtual machine instance a quantity of the first computing resource determined based at least in part on the reclaimable quantity of the first computing resource allocated to the first virtual machine instance and unclaimed by other processes executing within the first virtual machine instance.

7. The computer-implemented method of claim 6, wherein the reclaimable resource identification process comprises a memory balloon process.

8. The computer-implemented method of claim 6, wherein the first computing resource comprises one or more of memory, processors, processing time, data stores, or bandwidth.

9. The computer-implemented method of claim 8, wherein the demand for the first computing resource comprises one or more of a measured demand or a predicted demand.

10. The computer-implemented method of claim 6, wherein determining to reclaim the first computing resource is based at least in part on a demand for the first computing resource and an unallocated quantity of the first computing resource.

11. The computer-implemented method of claim 6, wherein determining to reclaim the first computing resource comprises:

determining that a threshold quantity of at least one other computing resource will be utilized in reclaiming the first computing resource; and determining, based at least in part on the resource utilization metrics, that the threshold quantity of the at least one other computing resource is available.

12. The computer-implemented method of claim 6, wherein identifying the first virtual machine instance comprises identifying, from a plurality of virtual machine instances on the host computing device, one or more of:
   a virtual machine instance having a lowest utilization of a specified computing resource over a first time period;
   a virtual machine instance having a longest time since utilization of the specified computing resource; or
   a virtual machine instance having a longest time since instantiation.

13. The computer-implemented method of claim 12, wherein the specified computing resource comprises the first computing resource.

14. The computer-implemented method of claim 6, wherein the reclaimable resource identification process identifies the reclaimable quantity of the first computing resource based at least in part on one or more requests to allocate the first computing resource.

15. The computer-implemented method of claim 6, wherein the reclaimable resource identification process determines, based at least in part on the resource utilization metrics, that a disk-backed portion of the first computing resource should be reclaimed.

16. A system comprising:
   a data store configured to store computer-executable instructions; and
   a processor in communication with the data store, wherein the computer-executable instructions, when executed by the processor, configure the processor to perform operations including:
      determining, based at least in part on a resource utilization metric, to reclaim one or more computing resources that are allocated to virtual machine instances;
      identifying, based at least in part on the resource utilization metric, a first virtual machine instance from which to reclaim a first computing resource;
      instructing, by a process external to the first virtual machine instance, a reclaimable resource identification process to execute within the first virtual machine instance, wherein the reclaimable resource identification process identifies at least a portion of the first computing resource allocated to the first virtual machine instance and unclaimed by other processes executing within the first virtual machine instance as a reclaimable portion of the first computing resource;
      obtaining, from the reclaimable resource identification process executing within the first virtual machine instance, an indication of the reclaimable portion of the first computing resource allocated to the first virtual machine instance and unclaimed by other processes executing within the first virtual machine instance;
      determining, based at least in part on the reclaimable portion of the first computing resource allocated to the first virtual machine instance and unclaimed by other processes executing within the first virtual machine instance, a quantity of the first computing resource to reclaim from the first virtual machine instance; and
      reclaiming from the first virtual machine instance the quantity of the first computing resource determined based at least in part on the reclaimable portion of the first computing resource allocated to the first virtual machine instance and unclaimed by other processes executing within the first virtual machine instance.

17. The system of claim 16, wherein the reclaimable portion of the first computing resource is identified based at least in part on a resource utilization profile for a user-submitted task executed by the first virtual machine instance.

18. The system of claim 17, wherein the resource utilization profile is based at least in part on a previous execution of the user-submitted task.

19. The system of claim 16, wherein the external process is a hypervisor.

* * * * *